US010719950B2

(12) United States Patent
Kawamoto

(10) Patent No.: US 10,719,950 B2
(45) Date of Patent: Jul. 21, 2020

(54) HEAD MOUNT DISPLAY (HMD) OPERATED WITH MOBILE DEVICE FOR TRANSFORMING REFERENCE COORDINATE SYSTEMS FOR PROVIDING SCREEN INFORMATION

(71) Applicant: SONY CORPORATION, Tokyo (JP)

(72) Inventor: Kenta Kawamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/328,089

(22) PCT Filed: Apr. 30, 2015

(86) PCT No.: PCT/JP2015/062934
§ 371 (c)(1),
(2) Date: Jan. 23, 2017

(87) PCT Pub. No.: WO2016/021252
PCT Pub. Date: Feb. 11, 2016

(65) Prior Publication Data
US 2017/0206673 A1 Jul. 20, 2017

(30) Foreign Application Priority Data

Aug. 5, 2014 (JP) ................................. 2014-159169

(51) Int. Cl.
G06T 7/70 (2017.01)
G06F 1/16 (2006.01)
(Continued)

(52) U.S. Cl.
CPC ............ *G06T 7/70* (2017.01); *G02B 27/0093* (2013.01); *G02B 27/0172* (2013.01);
(Continued)

(58) Field of Classification Search
CPC .......... G06F 3/002; G06F 3/005; G06F 3/012; G06F 3/04815; G06F 3/04883;
(Continued)

(56) References Cited

U.S. PATENT DOCUMENTS

2002/0106135 A1* 8/2002 Iwane .................... G06K 9/522
382/305
2005/0068293 A1* 3/2005 Satoh ....................... G01C 9/00
345/158
(Continued)

FOREIGN PATENT DOCUMENTS

JP 2005-038321 A 2/2005
JP 2011-186856 A 9/2011
(Continued)

*Primary Examiner* — Alexander Eisen
*Assistant Examiner* — Nelson Lam
(74) *Attorney, Agent, or Firm* — Chip Law Group

(57) ABSTRACT

Provided is an information processing apparatus that provides screen information to be displayed on an image display apparatus that is worn by a user on the head or face and used for viewing an image. On the basis of an image of a head mount display (HMD) captured by a camera mounted on an information terminal, the mutual positional relationship and posture between the HMD and the information terminal are grasped, and screen information transmitted from the information terminal is superimposed and displayed in a contents reproducing screen of the HMD being viewed with an appropriate posture at an appropriate position on the reproducing screen. Since only the information terminal is present with the same position and posture as in the real world in the contents reproducing screen, a user can perform a screen operation of the information terminal with the HMD on.

15 Claims, 16 Drawing Sheets

(51) Int. Cl.
*G02B 27/01* (2006.01)
*G02B 27/00* (2006.01)
*G06F 3/03* (2006.01)
*G06F 3/01* (2006.01)
*G06F 3/0488* (2013.01)
*H04N 7/18* (2006.01)
*G06F 3/14* (2006.01)

(52) U.S. Cl.
CPC ......... *G02B 27/0179* (2013.01); *G06F 1/163* (2013.01); *G06F 1/1686* (2013.01); *G06F 3/011* (2013.01); *G06F 3/012* (2013.01); *G06F 3/0325* (2013.01); *G06F 3/04883* (2013.01); *H04N 7/185* (2013.01); *G02B 2027/0134* (2013.01); *G02B 2027/0138* (2013.01); *G06F 3/1454* (2013.01); *G09G 2340/0464* (2013.01); *G09G 2340/12* (2013.01); *G09G 2356/00* (2013.01)

(58) Field of Classification Search
CPC ........ G06F 1/163; G06F 3/011; G06F 3/0325; G02B 27/0093; G02B 27/01; G02B 27/0101; G02B 27/0172; G02B 27/0179
USPC .......................................................... 345/7–9
See application file for complete search history.

(56) References Cited

U.S. PATENT DOCUMENTS

| | | | | |
|---|---|---|---|---|
| 2006/0273984 | A1* | 12/2006 | Wanda | G06F 3/011 345/7 |
| 2012/0327115 | A1* | 12/2012 | Chhetri | H04R 3/005 345/633 |
| 2014/0002329 | A1* | 1/2014 | Nishimaki | G06K 7/1404 345/8 |
| 2014/0015736 | A1* | 1/2014 | Kim | G06F 3/1454 345/1.2 |
| 2014/0168268 | A1* | 6/2014 | Oi | G06T 19/006 345/633 |
| 2015/0015459 | A1* | 1/2015 | Cho | G02B 27/017 345/8 |
| 2015/0316767 | A1* | 11/2015 | Ebstyne | G06T 7/80 345/8 |
| 2016/0203642 | A1* | 7/2016 | Thomas | G02B 27/017 345/8 |
| 2020/0057495 | A1* | 2/2020 | Chae | G06F 3/015 |

FOREIGN PATENT DOCUMENTS

| | | |
|---|---|---|
| JP | 2011-242591 A | 12/2011 |
| JP | 2012-042654 A | 3/2012 |
| JP | 2012-141461 A | 7/2012 |
| JP | 2012-186660 A | 9/2012 |

* cited by examiner

HEAD MOUNT DISPLAY (HMD) OPERATED WITH MOBILE DEVICE FOR TRANSFORMING REFERENCE COORDINATE SYSTEMS FOR PROVIDING SCREEN INFORMATION

CROSS REFERENCE TO RELATED APPLICATIONS

This application is a U.S. National Phase of International Patent Application No. PCT/JP2015/062934 filed on Apr. 30, 2015, which claims priority benefit of Japanese Patent Application No. JP 2014-159169 filed in the Japan Patent Office on Aug. 5, 2014. Each of the above-referenced applications is hereby incorporated herein by reference in its entirety.

TECHNICAL FIELD

The technology disclosed in the present specification relates to an information processing apparatus, an information processing method, and an image display system that provide screen information to be displayed on an image display apparatus that is worn by a user on the head or face and used for viewing an image.

BACKGROUND ART

There is known an image display apparatus that is worn on the head or face and used for viewing an image, that is, a head mount display. The head mount display includes, for example, image display units which are arranged for the respective right and left eyes and forms an enlarged virtual image of a display image by a virtual image optical system so that a user can observe an image with a realistic feeling.

The head mount display is equipped with a high-resolution display panel which includes, for example, a liquid crystal or an organic electro-luminescence (EL) element as each of the display units for right and left eyes. Further, head mount displays may be classified into a transmissive type and a light-shielding type.

The transmissive head mount display enables a wearer to observe surrounding scenery also when the wearer wears the head mount display on the head and an image is displayed thereon (refer to Patent Document 1, for example). Thus, a user can avoid the risk of, for example, collision with an obstacle when using the head mount display in the outside or during walking.

On the other hand, the light-shielding head mount display is configured to directly cover the eyes of a wearer when worn on the head, which increases an immersive feeling during viewing of an image. It is possible to duplicate a realistic feeling like viewing in a movie theater by projecting a display screen in an enlarged manner using the virtual optical system to allow a user to observe the display screen as an enlarged virtual image having an appropriate angle of view and duplicating multiple channels by a headphone (refer to Patent Document 2, for example). Further, also in the light-shielding type head mount display, there is known a video see-through method that has a built-in camera capable of capturing an image of the front side of a wearer and displays an external image obtained by the image capturing, and the wearer can observe surrounding scenery through the external image (refer to Patent Documents 3, 4, for example). Note that the former transmissive head mount display is called optical see-through or merely see-through contrary to the video see-through.

In either of the light-shielding and the transmissive types, the head mount display restricts the sense of sight and the sense of hearing of a user wearing the head mount display. In particular, the view of a user wearing the light-shielding head mount display is completely obstructed. Thus, the user cannot perform any operation to the outside such as answering a phone or input to the screen of a computer.

In the above video see-through head mount display, a view image of a user captured by a camera is displayed to allow the user to operate an object which is present in the view through the displayed image.

For example, there has been proposed a portable terminal system which is provided with a portable terminal which includes a display apparatus which performs display according to display information and a head mount display which displays a virtual screen in a display area in the view of a wearer on the basis of the display information acquired from the portable terminal (refer to Patent Document 5, for example).

However, the portable terminal system as described above is premised on that the head mount display is equipped with a camera which captures an image of the outside world. It is difficult for a user wearing a head mount display equipped with no camera to perform an operation with respect to the outside unless the head mount display is detached from the head to completely suspend viewing.

CITATION LIST

Patent Documents

Patent Document 1: Japanese Patent Application Laid-Open No. 2012-42654
Patent Document 2: Japanese Patent Application Laid-Open No. 2012-141461
Patent Document 3: Japanese Patent Application Laid-Open No. 2005-38321
Patent Document 4: Japanese Patent Application Laid-Open No. 2011-242591
Patent Document 5: Japanese Patent Application Laid-Open No. 2011-186856
Patent Document 6: Japanese Patent Application Laid-Open No. 2012-186660

SUMMARY OF THE INVENTION

Problems to be Solved by the Invention

An object of the technology disclosed in the present specification is to provide an excellent information processing apparatus, an excellent information processing method, and an excellent image display system capable of appropriately providing screen information to be displayed on an image display apparatus that is worn by a user on the head or face and used for viewing of an image.

Solutions to Problems

A technology disclosed in the present specification has been made in consideration of the problem, and a first aspect thereof is an information processing apparatus including:
an image capturing unit;
a position/posture calculation unit that calculates, on the basis of an image of an external image display apparatus captured by the image capturing unit, position and posture of the image display apparatus in a first reference coordinate system of the information processing apparatus;

a position/posture transform unit that transforms the position and posture of the image display apparatus in the first reference coordinate system to position and posture of the information processing apparatus in a second reference coordinate system of the image display apparatus; and an embedding position calculation unit that calculates, on the basis of the position and posture of the information processing apparatus in the second reference coordinate system, a position of embedding screen information relating to the information processing apparatus in a screen of the image display apparatus.

Further, a second aspect of the technology disclosed in the present specification is an information processing apparatus including:

an image capturing unit;

a display unit;

a position/posture calculation unit that calculates, on the basis of an image of an external image display apparatus captured by the image capturing unit, position and posture of the image display apparatus in a first reference coordinate system of the information processing apparatus;

a position/posture transform unit that transforms the position and posture of the image display apparatus in the first reference coordinate system to position and posture of the information processing apparatus in a second reference coordinate system of the image display apparatus; and an embedding position calculation unit that calculates, on the basis of the position and posture of the information processing apparatus in the second reference coordinate system, a position of embedding screen information of the display unit with respect to a screen of the image display apparatus.

According to a third aspect of the technology disclosed in the present specification, the information processing apparatus according to the second aspect further includes a communication unit that communicates with the image display apparatus. Further, screen information of the display unit and information of the embedding position are configured to be transmitted to the image display apparatus through the communication unit.

According to a fourth aspect of the technology disclosed in the present specification, the position/posture calculation unit of the information processing apparatus according to the second or third aspect is configured to calculate the position and posture of the image display apparatus in the first reference coordinate system on the basis of a reference index mounted on the image display apparatus.

According to a fifth aspect of the technology disclosed in the present specification, the information processing apparatus according to the fourth aspect further includes a reference index arrangement information acquisition unit that acquires information relating to a relationship between posture of the image display apparatus and posture of the reference index.

According to a sixth aspect of the technology disclosed in the present specification, the reference index arrangement information acquisition unit of the information processing apparatus according to the fifth aspect is configured to preload design information relating to the relationship between the posture of the image display apparatus and the posture of the reference index, and the position/posture calculation unit is configured to calculate the position and posture of the image display apparatus in the first reference coordinate system on the basis of the design information from an image captured by the image capturing unit when the information processing apparatus is arranged in a predetermined direction with respect to the image display apparatus.

According to a seventh aspect of the technology disclosed in the present specification, the reference index arrangement information acquisition unit of the information processing apparatus according to the fifth aspect is configured to receive information from the reference index.

According to an eighth aspect of the technology disclosed in the present specification, three or more reference indexes whose arrangement information is known are arranged on the image display apparatus. Further, the reference index arrangement information acquisition unit of the information processing apparatus according to the seventh aspect is configured to make discrimination between the reference indexes on the basis of at least one of color, texture, and shape and acquire axial information of the reference coordinate system of the image display apparatus.

According to a ninth aspect of the technology disclosed in the present specification, the reference index arrangement information acquisition unit of the information processing apparatus according to the seventh aspect is configured to receive information encoded in a flashing pattern from the reference index.

According to a tenth aspect of the technology disclosed in the present specification, the reference index arrangement information acquisition unit of the information processing apparatus according to the ninth aspect is configured to make an inquiry about information obtained by decoding the flashing pattern to a database to acquire coordinate information of the reference index, information of the reference index, or information of the image display apparatus.

According to a eleventh aspect of the technology disclosed in the present specification, the position/posture calculation unit of the information processing apparatus according to the second or third aspect is configured to calculate the position and posture of the image display apparatus in the first reference coordinate system using visual SLAM.

According to a twelfth aspect of the technology disclosed in the present specification, the information processing apparatus according to the eleventh aspect is configured to store position and posture of the image display apparatus calculated by the position/posture calculation unit in a reference state in which the information processing apparatus is held in an initial posture, and the position/posture transform unit is configured to calculate a change in the posture of the image display apparatus from the reference state and transform the position and posture of the image display apparatus in the first reference coordinate system to the position and posture of the information processing apparatus in the second reference coordinate system.

Further, a thirteenth aspect of the technology disclosed in the present specification is an image processing method including:

a position/posture calculation step of calculating, on the basis of an image of another image display apparatus captured by an image capturing unit mounted on an information terminal, position and posture of the image display apparatus in a first reference coordinate system of the information terminal;

a position/posture transform step of transforming the position and posture of the image display apparatus in the first reference coordinate system to position and posture of the information terminal in a second reference coordinate system of the image display apparatus; and an embedding position calculation step of calculating, on the basis of the position and posture of the information terminal in the second reference coordinate system, a position of embedding screen information of the information terminal with respect to a screen of the image display apparatus.

Further, a fourteenth aspect of the technology disclosed in the present specification is an image display system including:

a display apparatus fixed to a head or face of an observer; and an information processing apparatus that includes an image capturing unit and a display unit, calculates, on the basis of an image of an external image display apparatus captured by the image capturing unit, position and posture of the image display apparatus in a first reference coordinate system of the information processing apparatus, transforms the position and posture of the image display apparatus in the first reference coordinate system to position and posture of the information processing apparatus in a second reference coordinate system of the image display apparatus, and calculates a position of embedding screen information of the display unit with respect to a screen of the image display apparatus.

Note that the "system" described herein indicates a logical aggregate of a plurality of apparatuses (or functional modules which achieve a specific function), and it does not particularly matter whether the apparatuses or the functional modules are present in a single housing.

Effects of the Invention

According to the technology disclosed in the present specification, it is possible to provide an excellent information processing apparatus, an excellent information processing method, and an excellent image display system capable of appropriately providing screen information to be displayed on an image display apparatus that is worn by a user on the head or face and used for viewing an image.

Note that the effects described in the present specification are merely examples, and the effects of the present invention are not limited thereto. Further, the present invention may achieve an additional effect other than the above effects.

Other objects, features, and advantages of the technology disclosed in the present specification will become apparent from the more detailed description based on the following embodiment and the accompanying drawings.

MODE FOR CARRYING OUT THE INVENTION

Hereinbelow, an embodiment of the technology disclosed in the present specification will be specifically described with reference to the drawings.

Figure 1:
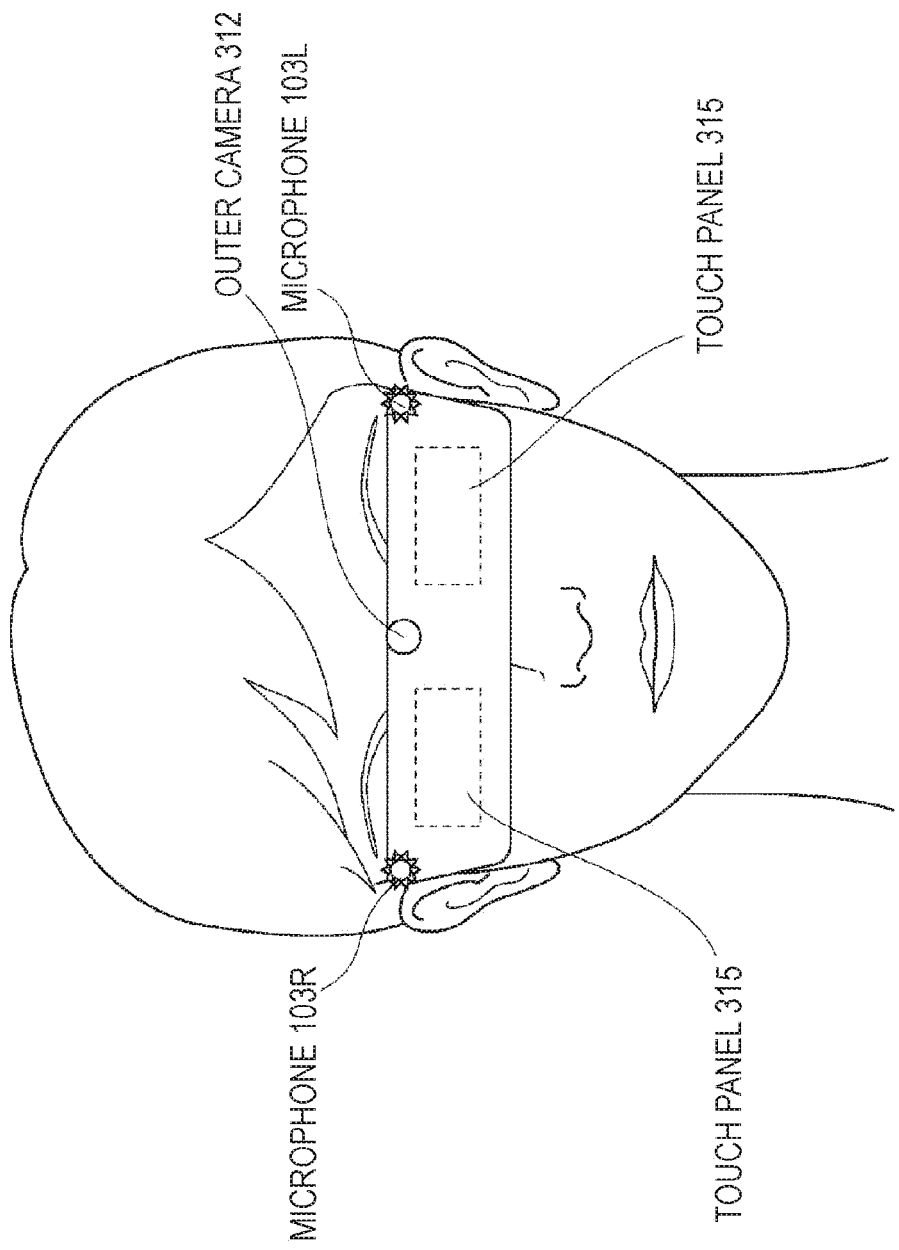
FIG. 1 is a diagram illustrating a front view of a user wearing a head mount display 100 on the head.

FIG. 1 illustrates a front view of a user wearing a head mount display 100 to which the technology disclosed in the present specification is applied on the head.

When a user wears the head mount display 100 on the head or face, the head mount display 100 directly covers the eyes of the user, which enables an immersive feeling to be given to the user viewing an image. Further, since the display image is invisible from the outside (that is, other people), privacy is easily protected in information display. Differently from a see-through type, a user wearing the head mount display 100 cannot directly look at scenery in the real world. When the head mount display 100 is equipped with an outer camera 312 which captures an image of scenery in a sight-line direction of a user, the user can indirectly look at scenery in the real world (that is, display the scenery by video see-through) by displaying the captured image. However, as described below, the technology disclosed in the present specification is not premised on the equipment of the outer camera 312 or the video see-through display.

The head mount display 100 illustrated in FIG. 1 is a structure which is similar to a cap shape and configured to directly cover the right and left eyes of a user wearing the head mount display 100. A display panel (not illustrated in FIG. 1) which is observed by a user is disposed on the inner side of a body of the head mount display 100 at a position facing the right and left eyes. The display panel includes, for example, a micro display such as an organic EL element or a liquid crystal display and a laser scanning display such as a retinal direct drawing display.

Microphones 103L, 103R are respectively placed near left and right ends of the body of the head mount display 100. The microphones 103L, 103R which are substantially symmetrically placed left and right enables only a voice (a voice of a user) which is localized on the center to be recognized and separated from surrounding noises and voices of other people. Accordingly, for example, it is possible to prevent a malfunction during an operation by audio input.

Further, a touch panel 315 through which a user can perform touch input using, for example, the fingertip is disposed near the back face of the display panel on the front face of the body of the head mount display 100. Although, in the illustrated example, a pair of right and left touch panels 315 are provided, one or three or more touch panels 315 may be provided.

Figure 2:
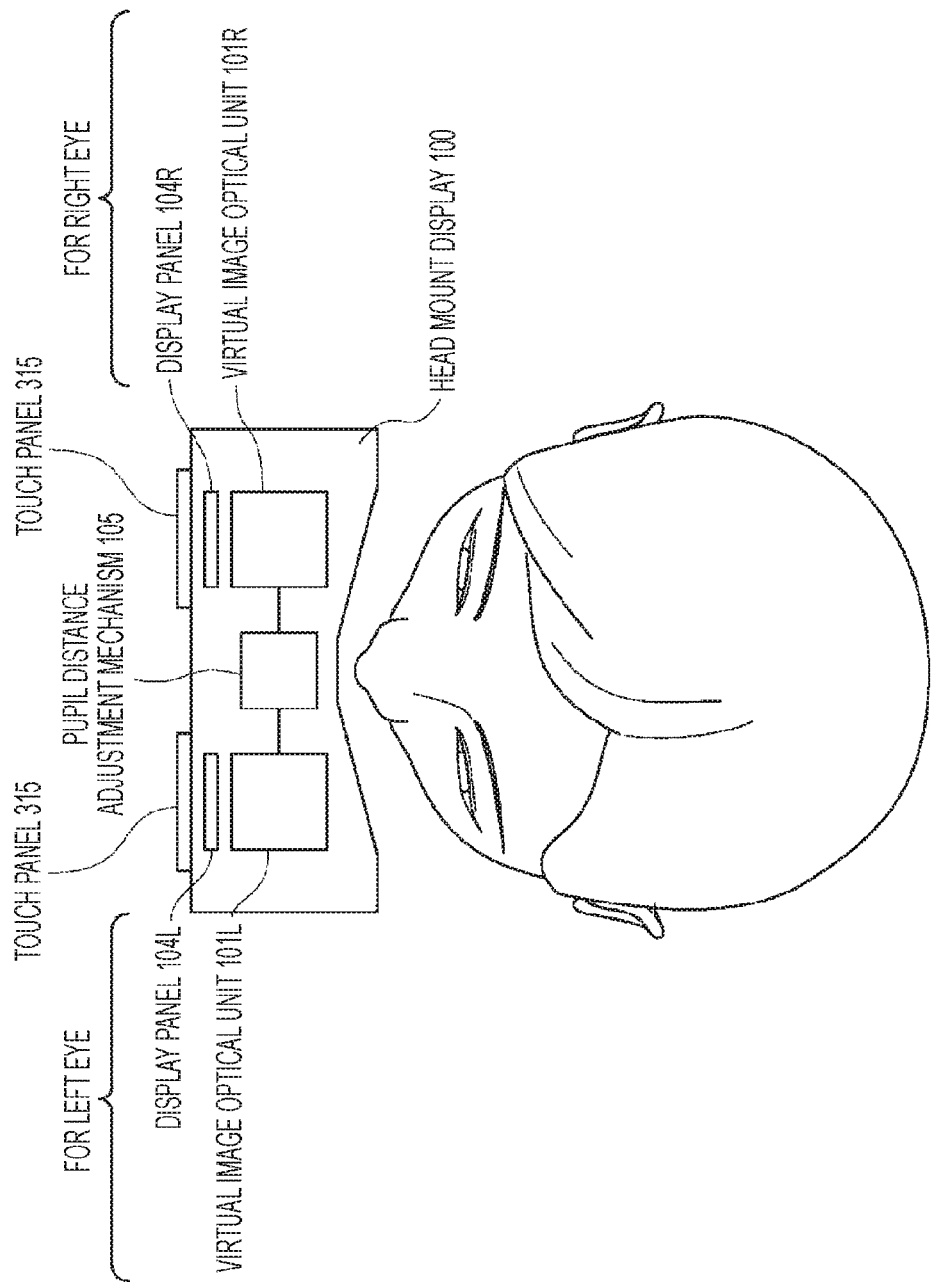
FIG. 2 is a diagram illustrating a top view of the user wearing the head mount display 100 illustrated in FIG. 1.

FIG. 2 illustrates a top view of the user wearing the head mount display 100 illustrated in FIG. 1. The illustrated head mount display 100 includes a display panel 104L for left eye and a display panel 104R for right eye on a side face facing the face of the user. Each of the display panels 104L, 104R includes, for example, a micro display such as an organic EL element or a liquid crystal display and a laser scanning display such as a retinal direct drawing display. Display images on the display panels 104L, 104R are observed as enlarged virtual images by a user by passing through virtual image optical units 101L, 101R. Further, since there is an individual difference in the height of the eyes or the pupil distance between users, it is necessary to align the eyes of a user wearing the head mount display 100 with the right and left display systems. In the example illustrated in FIG. 2, a pupil distance adjustment mechanism 105 is disposed between the display panel for right eye and the display panel for left eye.

Figure 3:
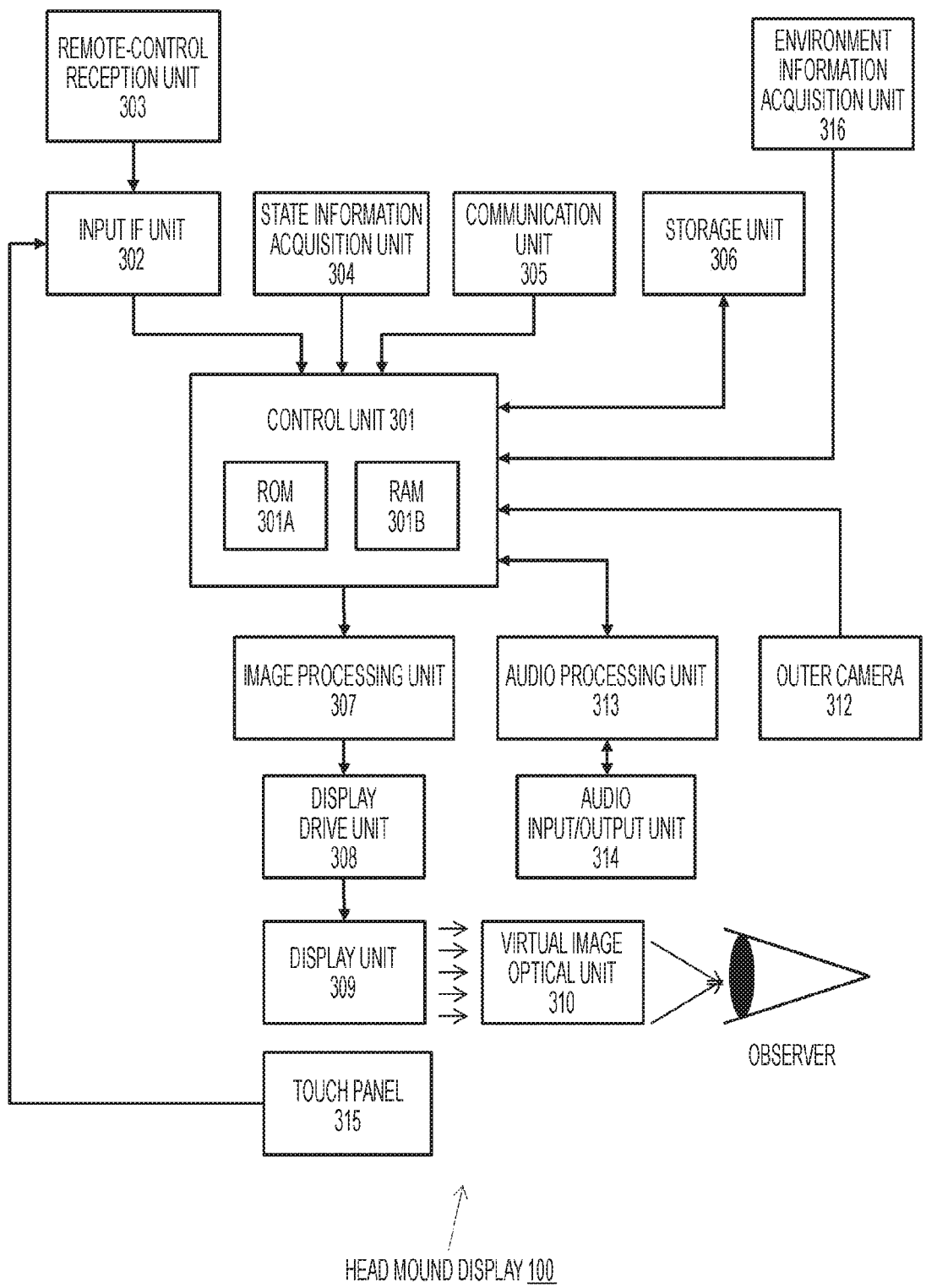
FIG. 3 is a diagram illustrating an example of an internal configuration of the head mount display 100.

FIG. 3 illustrates an example of an internal configuration of the head mount display 100. Hereinbelow, each unit will be described.

A control unit 301 is provided with a read only memory (ROM) 301A and a random access memory (RAM) 301B. A program code to be executed by the control unit 301 and various data are stored in the ROM 301A. The control unit 301 starts display control of an image by executing a program loaded to the RAM 301B and totally controls the operation of the entire head mount display 100.

Note that the program stored in the ROM 301A includes a display control program for displaying a reproducing moving image on the screen, and displaying, in a super imposed manner, image information taken from an external apparatus (e.g., a smartphone) on the screen. Further, the data stored in the ROM 301A includes identification information (including a model number and a manufacturer's serial number) which is unique to the head mount display 100, user attribute information such as authentication information (e.g., a personal identification number, a password, or biological information) for authenticating a user who uses the head mount display 100, and design information of the head mount display 100 (the shape or the arrangement of a reference index mounted on the head mount display 100).

An input interface (IF) unit 302 is provided with one or more operators (not illustrated) such as a key, a button, and a switch to which a user performs an input operation, and receives an instruction of the user through the operators and outputs the received instruction to the control unit 301. Further, the input operation unit 302 receives an instruction of a user which includes a remote-control command received by a remote-control reception unit 303 and outputs the received instruction to the control unit 301.

Further, when a user performs a touch operation to the touch panel 315 which is disposed on the outer side of the body of the head mount display 100 with the fingertip, the input interface (IF) unit 302 outputs input information such as coordinate data of a position touched by the fingertip to the control unit 301. For example, when the touch panel 315 is arranged exactly on the back face of a display image (an enlarged virtual image observed through a virtual image optical unit 310) of a display unit 309 on the front face of the body of the head mount display 100 (refer to FIG. 1), a user can perform a touch operation with a feeling like touching the display image with the fingertip.

A state information acquisition unit 304 is a functional module which acquires state information of the body of the head mount display 100 or a user wearing the head mount display 100. The state information acquisition unit 304 may be equipped with various sensors for detecting state information by itself or may acquire state information from an external apparatus (e.g., a smartphone or a wristwatch worn by the user, or another multifunction terminal) which is provided with some or all of these sensors through a communication unit 305 (described below).

The state information acquisition unit 304 acquires, for example, information of the position and posture or information of the posture of the head of a user to track a head motion of the user. In order to track a head motion of the user, the state information acquisition unit 304 is a sensor capable of detecting nine axes in total including a three-axis gyro sensor, a three-axis accelerometer, and a three-axis magnetic field sensor. Further, the state information acquisition unit 304 may further use, in combination, any one or two or more sensors such as a global positioning system (GPS) sensor, a Doppler sensor, an infrared sensor, and a radio field intensity sensor. Further, the state information acquisition unit 304 may further use, in combination, information provided from various infrastructures such as cellular phone base station information and Place Engine (registered trademark) information (e.g., electrically measured information from a wireless LAN access point) to acquire the position/posture information. Although, in the example illustrated in FIG. 3, the state acquisition unit 304 for head motion tracking is incorporated in the head mount display 100, the state acquisition unit 304 may include an accessory component which is externally attached to the head mount display 100. In the latter case, the externally-attached state acquisition unit 304 transmits posture information of the head to the body of the head mount display 100 through wireless communication such as Bluetooth (registered trademark) communication or a high-speed wired interface such as a universal serial bus (USB).

Further, in addition to the tracking of the head motion of a user described above, the state information acquisition unit 304 acquires, as state information of a user wearing the head mount display 100, for example, a working state of a user (wearing/unwearing of the head mount display 100), an action state of a user (a moving state such as standing still, walking, or running, a gesture by the hand or fingertip, an opening/closing state of the eyelid, a sight-line direction, or the large/small of the pupil), a mental state (the degree of impression such as whether a user is immersed in or concentrated on the observation of a display image, the degree of excitation, the degree of awareness, feeling, or emotion), and a physiological state. Further, the state information acquisition unit 304 may be provided with the outer camera 312, a wearing sensor which includes, for example, a mechanical switch, an inner camera which captures an image of the face of a user, various state sensors such as a gyro sensor, an accelerometer, a speed sensor, a pressure sensor, a temperature sensor which senses the body temperature or the ambient temperature, a perspiration sensor, a pulse sensor, a myogenic potential sensor, an ocular potential sensor, a brain wave sensor, an exhalation sensor, and a gas/ion concentration sensor, and a timer (all not illustrated) to acquire these state information items from a user. Further, the state information acquisition unit 304 may use a wearing sensor (refer to Patent Document 6, for example) which detects, when a user has worn the head mount display on the head, the wearing of the head mount display by the user in conjunction with the motion of abutment against the forehead in the head to detect wearing/unwearing of the head mount display 100.

An environment information acquisition unit 316 is a functional module which acquires information relating to the environment surrounding the body of the head mount display 100 or a user wearing the head mount display 100. The information relating to the environment described herein includes sound; the volume of air; air temperature; air pressure; atmosphere (smoke; dense fog; electromagnetic waves (ultraviolet rays, blue light, radio waves), heat waves (infrared rays) and radioactive rays applied to the head mount display 100 or a user; carbon monoxide, carbon dioxide, oxygen and nitrogen compound (nicotine) in the atmosphere; nitrogen oxide ($NO_x$) and hydrocarbon (volatile organic compounds (VOC)) floating in the atmosphere or photochemical smog generated by a photochemical reaction of these materials due to the influence of ultraviolet rays; particulate matters; pollen; dust such as house dust; and harmful chemical substances such as asbestos); and other environmental factors. The environment information acquisition unit 316 may be equipped with various environmental sensors such as a sound sensor and an air volume sensor to detect environment information. The environmental sensors may include the microphone and the outer camera 312 described above. Alternatively, the environment information acquisition unit 316 may acquire environment information from an external apparatus (e.g., a smartphone or a wristwatch worn by the user, or another multifunction terminal) which is provided with some or all of these sensors through the communication unit 305 (described below).

The outer camera 312 is arranged, for example, on substantially the center in the front face of the body of the head mount display 100 (refer to FIG. 2) and capable of capturing surrounding images. However, as described below, the technology disclosed in the present specification is not premised on the equipment or the use of the outer camera 312.

The communication unit 305 performs communication processing with an external apparatus (not illustrated), and modulation/demodulation and encoding/decoding processing of a communication signal. The external apparatus includes a contents reproducing apparatus (a Blue-ray Disk player or a DVD player) which supplies viewing contents when a user uses the head mount display 100, a streaming server, and information terminals such as a smartphone and a personal computer used by a user. Further, the control unit 301 transmits transmission data to the external apparatus through the communication unit 305.

The communication unit 305 has any configuration. For example, the communication unit 305 may be configured according to a communication mode which is used in a transmission/reception operation with the external apparatus as a communication partner. The communication mode may be a wired form or a wireless form. The communication standard described herein includes mobile high-definition link (MHL), universal serial bus (USB), high definition multimedia interface (HDMI, registered trademark), Wi-Fi (registered trademark), Bluetooth (registered trademark) communication, Bluetooth (registered trademark) low energy (BLE) communication, ultra-low power consumption wireless communication such as ANT, and mesh network standardized by, for example, IEEE802.11s. Alternatively, the communication unit 305 is, for example, a cellular wireless transmitter receiver which operates in accordance with a standard specification such as wideband code division multiple access (W-CDMA) or long term evolution (LTE).

A storage unit 306 is a mass storage device which includes, for example, a solid state drive (SSD). The storage unit 306 stores therein an application program to be executed by the control unit 301 and various data. For example, contents viewed by a user using the head mount display 100 are stored in the storage unit 306.

An image processing unit 307 further performs signal processing such as image quality correction and performs transformation to a resolution corresponding to the screen of the display unit 309 with respect to an image signal output from the control unit 301. Then, a display drive unit 308 sequentially selects pixels of the display unit 309 for each row and line-sequentially scans the pixels to supply a pixel signal based on the signal-processed image signal.

The display unit 309 includes a display panel which includes, for example, a micro display such as an organic EL element or a liquid crystal display or a laser scanning display such as a retinal direct drawing display. The virtual image optical unit 310 projects, in an enlarged manner, a display image of the display unit 309 and allows a user to observe the display image as an enlarged virtual image.

Note that the display image output by the display unit 309 includes commercial contents (virtual world) which are supplied from a contents reproducing apparatus (a Blue-ray Disk player or a DVD player) or a streaming server and a captured image of the outer camera 312 (an image in the real world such as a view image of a user). Further, image information transmitted from an information terminal such as a smartphone or a personal computer may be displayed in a superimposed manner on the contents reproducing screen.

An audio processing unit 313 further performs audio quality correction and audio amplification with respect to an audio signal output from the control unit 301 and performs signal processing of an audio signal input thereto. Then, an audio input/output unit 314 outputs the processed audio to the outside and performs voice input from the microphone (described above).

A user wearing the head mount display 100 may wish to operate another information terminal such as a smartphone when the view of the user is completely obstructed during viewing of contents. For example, the user may wish to check a record of incoming mails or calls or wish to know the current time.

When the head mount display 100 inputs screen information of an external information terminal, and changes an original contents reproducing screen to the screen of the external information terminal so as to be displayed on the display unit 309 or displays, in an superimposed manner, the screen of the external information terminal screen on the original screen, a user can check the contents of the screen of the external information terminal without detaching the head mount display 100 from the head. The superimposition display described herein includes separately displaying a small screen in a picture-in-picture form and blending two screens at a predetermined ratio.

However, when a user displays the screen of an information terminal held in his/her hand on the head mount display 100 and the position of the screen of the information terminal is not changed by moving the hand, the operation lacks reality. Further, when the position of the screen of the information terminal displayed by the display unit 309 is not completely linked with the position of the screen of the actual information terminal, it is extremely difficult for a user to perform an operation with respect to the screen of the actual information terminal while looking at the screen of the information terminal displayed on the head mount display 100.

The present applicant thinks that, in order for a user to grasp the positional relationship between the hand holding the information terminal and an operation finger, not only feedback of somatic sensation such as cutaneous sensation, but also correction by visual information is required.

Figure 4:
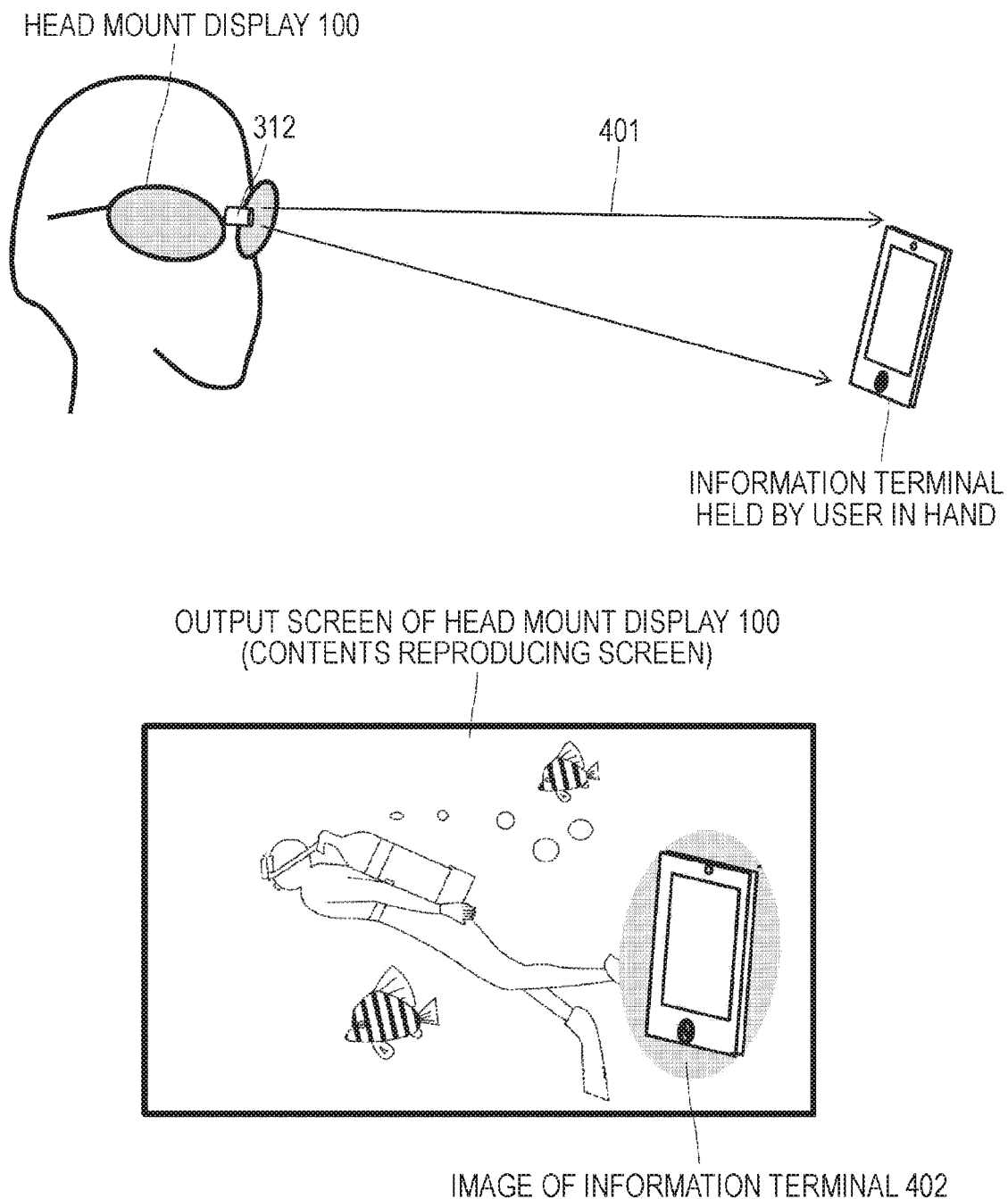
FIG. 4 is a diagram illustrating a state in which the mutual positional relationship and posture of an information terminal are grasped on the basis of an image captured by an outer camera 312 of the head mount display 100 and an image of the information terminal is displayed in a superimposed manner.

For example, as illustrated in FIG. 4, an image of an information terminal which is held by a user in his or her hand is captured using the outer camera 312 (reference sign 401). Then, the captured image of the information terminal is displayed on the contents reproducing screen of the head mount display 100 with the same position and posture as the actual information terminal on the view of the user (reference sign 402). Accordingly, the user can easily perform an operation with respect to the screen of the actual information terminal while looking at the screen of the information terminal which is displayed by video see-through on the head mount display 100. Specifically, it is possible to display, in a superimposed manner, an image of the information terminal on the contents reproducing screen of the head mount display 100 with the same position and posture as the actual information terminal on the view of the user by grasping the mutual positional relationship and posture between the head mount display 100 and the information terminal on the basis of the image captured by the outer camera 312.

Figure 5:
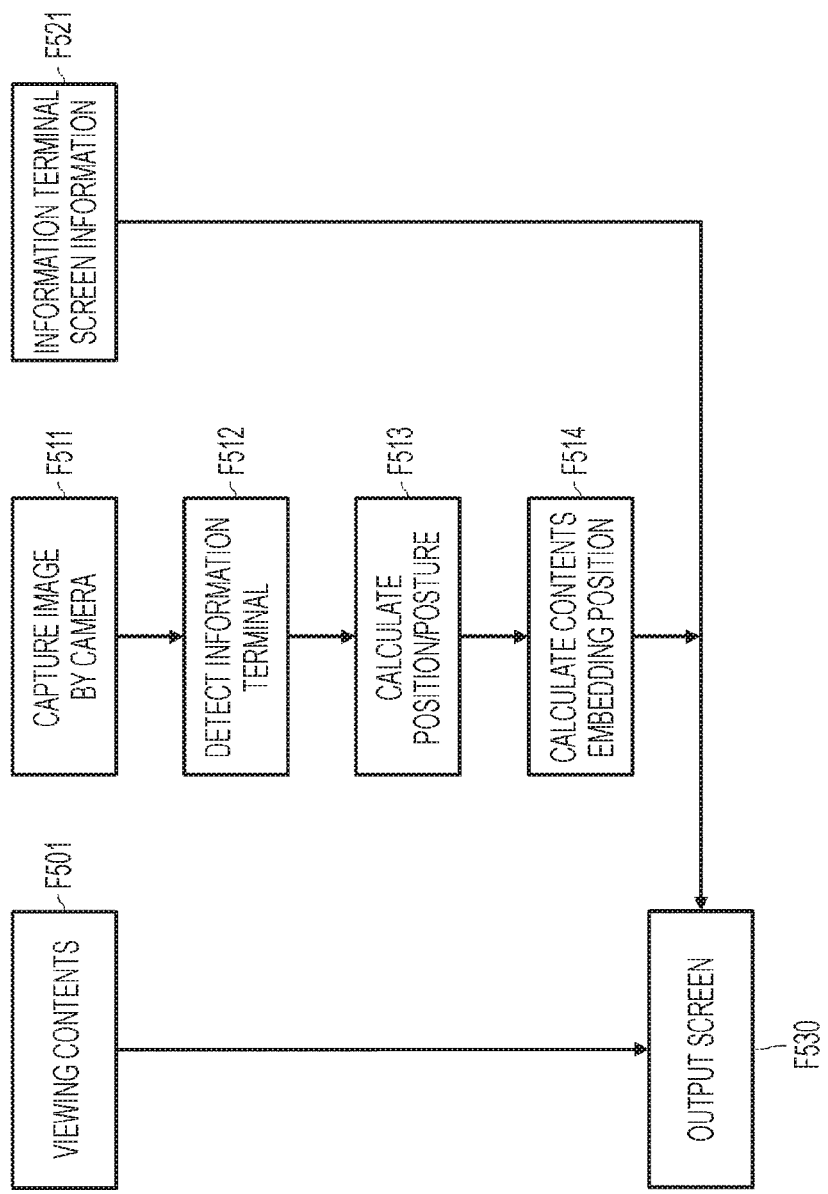
FIG. 5 is a diagram illustrating a procedure for achieving screen display illustrated in FIG. 4.

FIG. 5 illustrates a procedure for achieving the screen display illustrated in FIG. 4.

In the head mount display 100, viewing contents are displayed on the display unit 309 (F501).

Further, in the head mount display 100, an image is captured using the outer camera 312 (F511). Then, object recognition processing is performed with respect to the captured image to detect the information terminal (F512). Then, the position and posture of the information terminal are calculated (F513).

Here, a reference coordinate system of the display unit 309 which displays the information terminal on the head mount display 100 (hereinbelow, merely referred to as the reference coordinate system of the head mount display 100) differs from a reference coordinate system of the outer camera 312 which captures an image of the information terminal in a strict sense. Thus, in F513, it is necessary to transform the position and posture of the information terminal detected in the camera reference coordinate system to the position and posture of the information terminal in the reference coordinate system of the head mount display 100.

Further, in order to improve the accuracy of object recognition and position/posture calculation, a visual reference index (marker) may be applied to the information terminal. For example, a known pattern displayed on the screen of the information terminal may be used as the reference index. Alternatively, the position and posture of the information terminal may be calculated with no marker (described below). Then, the position of embedding screen information of the information terminal with respect to the screen of the viewing contents is calculated on the basis of information of the calculated position and posture (F514).

Then, the head mount display 100 acquires screen information from the information terminal (F521), and embeds the screen information in the contents reproducing screen at the embedding position calculated in F514 to generate an output screen (F530).

As a result of such processing, the screen of the information terminal is present on the contents reproducing screen of the head mount display 100 with the same position and posture as the actual information terminal on the view of the user. Thus, the user can perform a screen check and an input operation in the information terminal without losing reality while continuously viewing contents.

However, in the above method as illustrated in FIGS. 4 and 5, the outer camera 312 is required to correct the displayed position and posture of the information terminal using visual information. In other words, disadvantageously, the above method cannot be applied to a product that is not equipped with the outer camera 312.

FIGS. 1 to 3 illustrate, as an example, the head mount display 100 equipped with the outer camera 312. However, an outer camera is not necessarily provided as standard equipment, and a considerable number of products equipped with no outer camera have already become widespread. In this kind of existing products, the head mount display 100 includes no means for grasping the mutual positional relationship and posture between the display body and an information terminal as a current operation target. Thus, it is not possible to display the information terminal on the contents reproducing screen of the head mount display 100 with the same position and posture as the actual information terminal on the view of a user.

On the other hand, many of information terminals to be the current operation target such as smartphones and personal computers are products equipped with cameras. Thus, the present applicant focuses on this point and proposes a method that conversely captures an image of the head mount display 100 using a camera mounted on an information terminal (reference sign 601) to grasp the mutual positional relationship and posture between the head mount display 100 and the information terminal as the current operation target and displays screen information transmitted from the information terminal on the contents reproducing screen of the head mount display 100 with the same position and posture as the actual information terminal on the view of a user (reference sign 602) as illustrated in FIG. 6.

Figure 6:
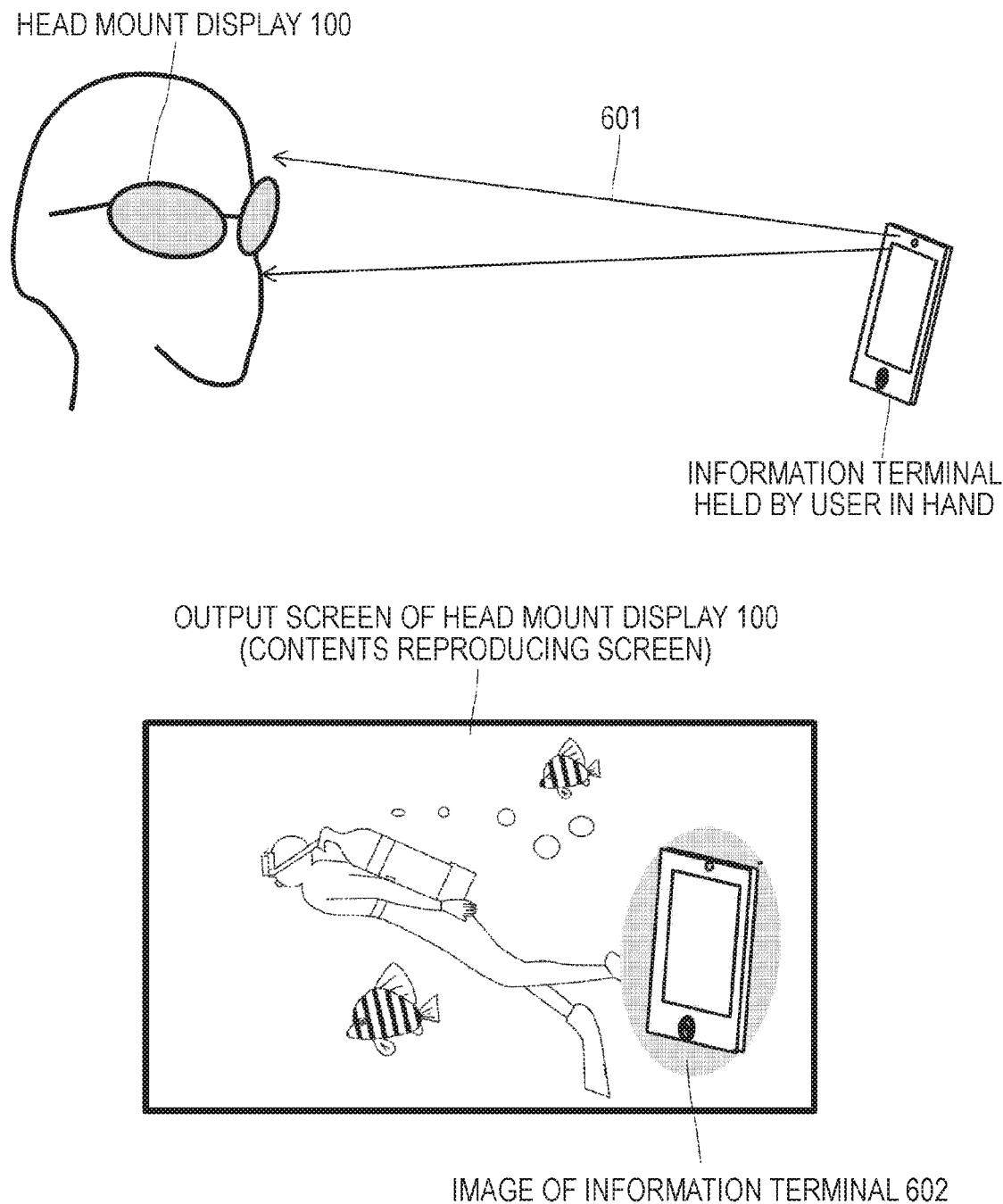
FIG. 6 is a diagram illustrating a state in which the mutual positional relationship and posture between the head mount display 100 and the information terminal are grasped on the basis of an image captured by a camera of the information terminal and an image of the information terminal is displayed in a superimposed manner.
Figure 7:
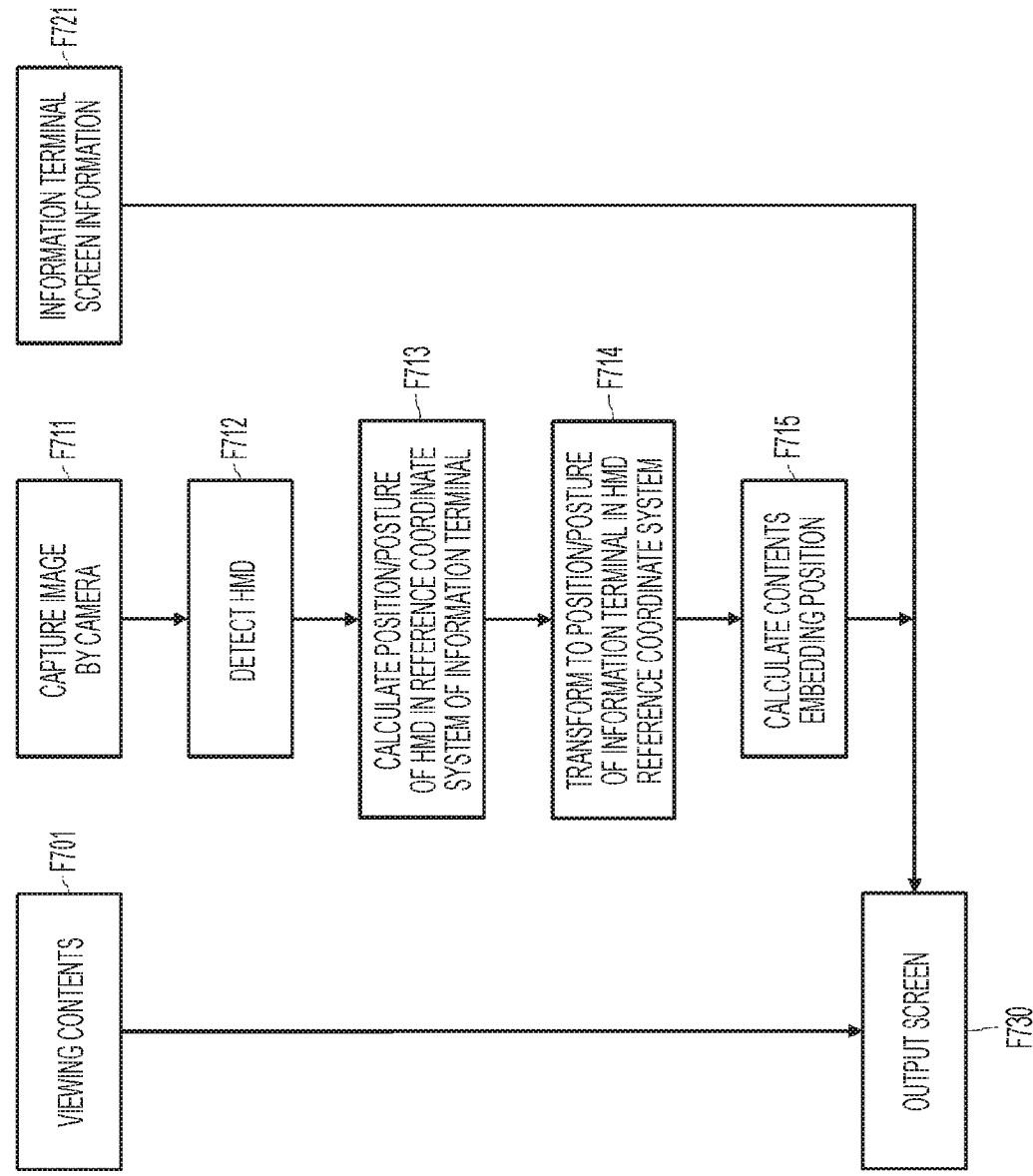
FIG. 7 is a diagram illustrating a procedure for achieving screen display illustrated in FIG. 6.

FIG. 7 illustrates a procedure for achieving the screen display illustrated in FIG. 6.

In the head mount display 100, viewing contents are displayed on the display unit 309 (F701).

On the other hand, in the information terminal, an image is captured using the camera which is provided as standard equipment (F711) The information terminal is held by a user wearing the head mount display 100 in his or her hand, and the camera faces the front face of the head mount display 100. Then, object recognition processing is performed with respect to the captured image to detect the head mount display 100 (F712). Then, the position and posture of the head mount display 100 in a coordinate system based on the information terminal (or a camera coordinate system) are calculated (F713).

Then, the position and posture of the head mount display 100 in the reference coordinate system of the information terminal are transformed to the position and posture of the information terminal in the reference coordinate system of the head mount display 100 (F714), and the position of embedding screen information of the information terminal with respect to the screen of the viewing contents is calculated on the basis of information of the calculated position and posture (F715). Note that the processes (F712 to F715) after the processing of the captured image may be executed by either the information terminal or the head mount display 100, or may be executed by an external device such as a cloud computer.

Then, the head mount display 100 acquires screen information from the information terminal (F721), and embeds the screen information in the contents reproducing screen at the embedding position calculated in F715 to generate an output screen (F730).

As a result of such processing, the screen of the information terminal with the same position and posture as the actual information terminal on the view of the user is displayed in the contents reproducing screen (an image in a virtual world) of the head mount display 100. Thus, the user whose view is completely obstructed can perform a screen check and an input operation in the information terminal without losing reality while continuously viewing contents.

Figure 16:
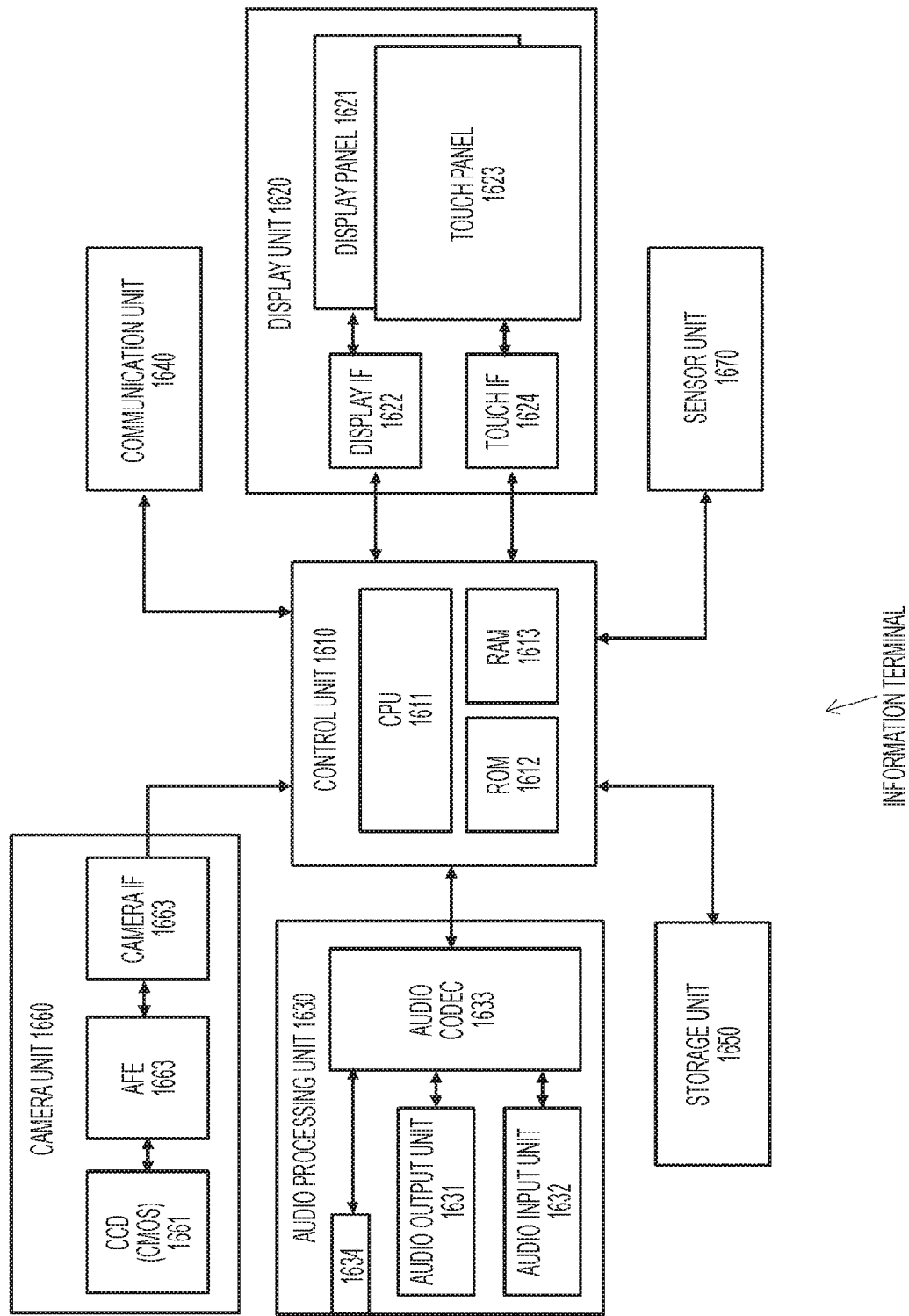
FIG. 16 is a diagram illustrating an example of the configuration of the information terminal.

FIG. 16 illustrates an example of the configuration of an information terminal capable of achieving the processing as illustrated in FIG. 7. The illustrated information terminal is configured by connecting a display unit 1620, an audio processing unit 1630, a communication unit 1640, a storage unit 1650, a camera unit 1660, a sensor unit 1670 and the like to a control unit 1610.

The control unit 1610 includes, for example, a central processing unit (CPU) 211, a ROM 1612, and a RAM 1613. A program code to be executed by the CPU 1611 and information which is essential for the information terminal are stored in the ROM 1612.

The CPU 1611 loads the program code to the RAM 1613 from the ROM 1612 or the storage unit 1640 and executes the program code. The program executed by the CPU 1611 includes operating systems such as Android and iOS, an application for transferring screen information to an external image display apparatus (e.g., the head mount display 100), and various application programs which operate under an execution environment provided by the operating system.

The display unit 1620 is provided with a display panel 1621 which includes, for example, a liquid crystal element or an organic EL element and a transparent touch panel 1623 which is stuck to the upper face of the display panel 1622. The display panel 1621 is connected to the control unit 1610 through a display interface 1622, and displays and outputs image information generated by the control unit 210. Further, the touch panel 1623 is connected to the control unit 1610 through a touch interface 1624 and outputs coordinate information obtained by an operation of a user on the display panel 1621 with the fingertip to the control unit 1610. The control unit 1610 detects a user operation such as a tap, long press, flick, or swipe on the basis of the input coordinate information and activates processing corresponding to the user operation.

The audio processing unit 1630 is provided with an audio output unit 1631 such as a speaker, an audio input unit 1632 such as a microphone, and an audio codec 1633 which encodes and decodes an audio signal which is input and output. Further, the audio processing unit 1630 may further be provided with an output terminal 1634 for outputting an audio signal to a headphone (not illustrated).

The communication unit 1640 performs information communication processing between an application executed by the control unit 1610 and an external apparatus. The external apparatus described herein includes a television set, an information terminal (not illustrated) handled by another user, and server which is present on the Internet. The communication unit 1640 is equipped with a physical layer module such as Wi-Fi, near field communication (NFC), or Bluetooth (registered trademark) according to a commutation medium to be used and performs modulation/demodulation processing or encoding/decoding processing of a communication signal which is transmitted and received through the physical layer module. Further, screen information displayed on the display unit 1620 may be transferred to an external image display apparatus (e.g., the head mount display 100) through the communication unit 1640.

The storage unit 1650 includes a mass storage device such as a solid state drive (SSD) or a hard disc drive (HDD). For example, an application program and contents downloaded through the communication unit 1640 and image data such as a still image and a moving image captured by the camera unit 1660 are stored in the storage unit 1650.

The camera unit 1660 is provided with an image sensor 1661 which photoelectrically converts light taken through a lens (not illustrated) such as a charge coupled device (CCD) or a complementary metal oxide semiconductor (CMOS) and an analog front end (AFE) processing unit 1662 which performs noise reduction and digitization of a detection signal of the image sensor 1661 to generate image data, and outputs the generated image data to the control unit 1610 from the camera interface 1663.

The sensor unit 1670 includes, for example, a global positioning system (GPS) sensor for acquiring positional information of the information terminal, a gyro sensor for detecting the posture or an acting force of the body of the information terminal, and an accelerometer.

In the method illustrated in FIGS. 6 and 7, one or more reference indexes such as an augmented reality (AR) marker may be mounted on the head mount display 100 so as to more accurately grasp the mutual positional relationship and posture between the head mount display 100 and the information terminal on the basis of an image captured by the camera which is mounted on the information terminal.

For example, detailed information (e.g., product information such as the model number and the manufacturer's serial number) of the head mount display 100 can be acquired depending on the kind of the reference index. Using the detailed information further improves the accuracy of recognizing the mutual position and posture between the head mount display 100 and the information terminal. The following (1) and (2) can be described as examples of a use method of the reference index.

(1) The direction and unit length of an optical principal axis are specified from the arrangement of a reference index based on a certain agreement to precisely perform coordinate axis alignment and position measurement.

(2) Identification information of a predetermined bit length (e.g., 32-bit) is encoded in the reference index, and a database is searched using the identification information to obtain information similar to (1) to precisely perform coordinate axis alignment and position measurement.

Further, in the case of marker-less, that is, when no reference index is mounted on the head mount display 100, it is not possible to acquire absolute position/posture information. It is merely possible to measure a displacement in position/posture relative to an initial position in the start of processing. Thus, when the camera mounted on the information terminal captures an image of the head mount display 100, a user may hold the information terminal at a previously determined initial position and send a reset signal which notifies the initial position to the information terminal. The previously-determined initial position described herein is, for example, the front side of the eye-line of a user wearing the head mount display 100. Further, a method for sending a reset signal includes tapping a touch panel screen of the information terminal and operating a switch on the head mount display 100. A relative displacement thereafter is measured and reflected to rendering on the screen of the head mount display 100.

Note that, as a specific marker-less method, the position/posture calculation may be performed using visual simultaneous localization and mapping (SLAM). The visual SLAM is a technology capable of simultaneously performing own position estimation of the camera and map creation under an unknown environment. An example of visual SLAM includes integrated augmented reality technology "SmartAR" (registered trademark of Sony Corporation). According to the marker-less method, it is not necessary to apply the reference index to the head mount display 100, and the method can be applied to any product.

Here, a method for calculating the position and posture of the information terminal to be embedded in the screen of the display unit 309 of the head mount display 100 will further be considered.

As illustrated in FIGS. 4 and 5, when the position and posture of the information terminal to be embedded in the screen are calculated from an image captured by the outer camera 312 which is mounted on the head mount display 100, the reference coordinate system of the head mount display 100 differs from the reference coordinate system of the outer camera 312 in a strict sense. Thus, in F513, it is necessary to transform the position and posture of the information terminal detected in the camera reference coordinate system to the position and posture of the information terminal in the reference coordinate system of the head mount display 100. The position of the outer camera 312 with respect to the head mount display 100 is fixed, that is, known. Thus, it is easy to transform the position and posture of the information terminal detected in the camera reference coordinate system to the position and posture of the information terminal in the reference coordinate system of the head mount display 100.

Next, a case in which the position and posture of the information terminal to be embedded in the screen are calculated using the camera which is mounted on the information terminal as illustrated in FIGS. 6 and 7 will be considered.

The position of the camera with respect to the information terminal is fixed, that is, known. Thus, it is easy to transform the position and posture of the head mount display 100 whose image is captured by the camera to the position and posture of the head mount display 100 in the reference coordinate system of the information terminal.

Further, it is possible to measure the position and posture of the reference index which is mounted on the head mount display 100 in the reference coordinate system of the camera which is mounted on the information terminal.

However, the relationship between the posture of the head mount display 100 and the posture of the reference index mounted on the head mount display 100 cannot be acquired by measurement from the outside. Thus, reference index arrangement information transmission means for transmitting information of the posture relationship between the head mount display 100 and the reference index to the information terminal is required to more precisely perform transform processing of the position and posture in F714. The following (1) to (3) will be described as examples of the reference index arrangement information transmission means.

(1) Design information of the head mount display 100 is used as known information of the information terminal.

(2) The reference index transmits necessary information to the information terminal.

(3) An initialization process by a user is gone through.

Hereinbelow, each transmission means will be specifically described.

(1) Design information of the head mount display 100 is used as known information of the information terminal.

For example, a dedicated application of the information terminal (e.g., an application for calculating the position and posture of the head mount display 100 from an image captured by the camera) or information corresponding to the model number of the head mount display 100 is preloaded to the information terminal. This case is premised on that the shape and arrangement of the reference index which is mounted on the head mount display 100 are all previously designed. Further, defining, for example, a principal axis of the head mount display 100 and arranging the reference index so as to be aligned with the principal axis is a promise or specification. This transmission means enables the shape of the reference index to have flexibility.

Figure 8:
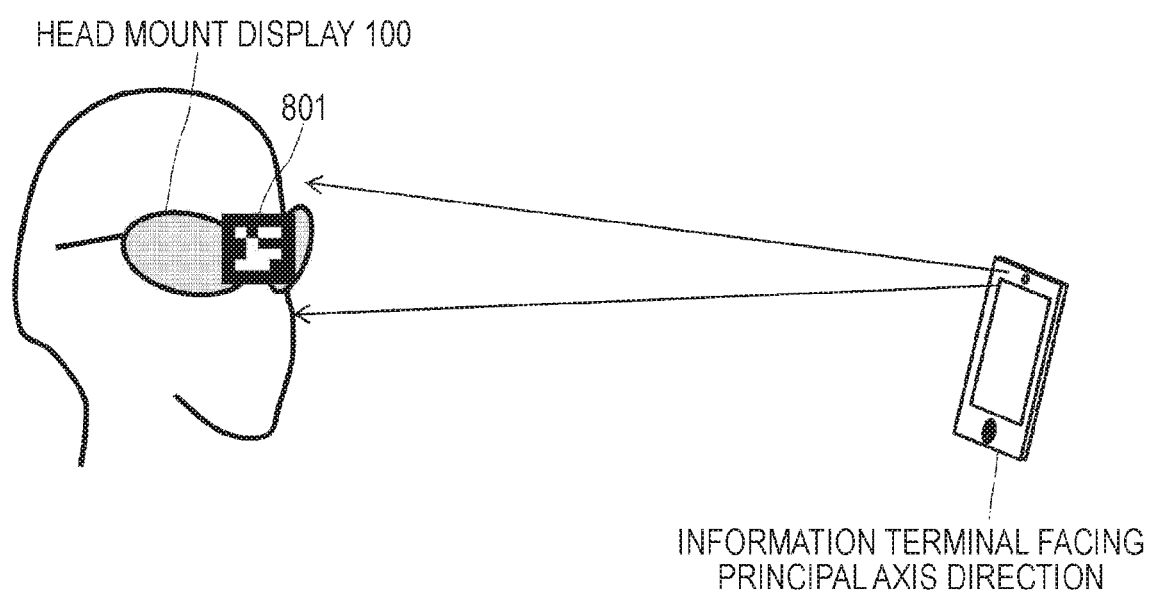
FIG. 8 is a diagram illustrating a state in which an AR marker 801 is mounted on the head mount display 100, and a camera of an information terminal which is held in a principal axis front direction captures an image of the head mount display 100.

FIG. 8 illustrates a state in which an AR marker 801 is mounted on the head mount display 100, and the camera of the information terminal which is held in a principal axis front direction captures an image of the head mount display 100. Arrangement information for sticking the AR marker is known. In the information terminal, the relative position and posture of the information terminal can be calculated by observing the position and posture (shape) of the AR marker on the captured image.

Figure 9:
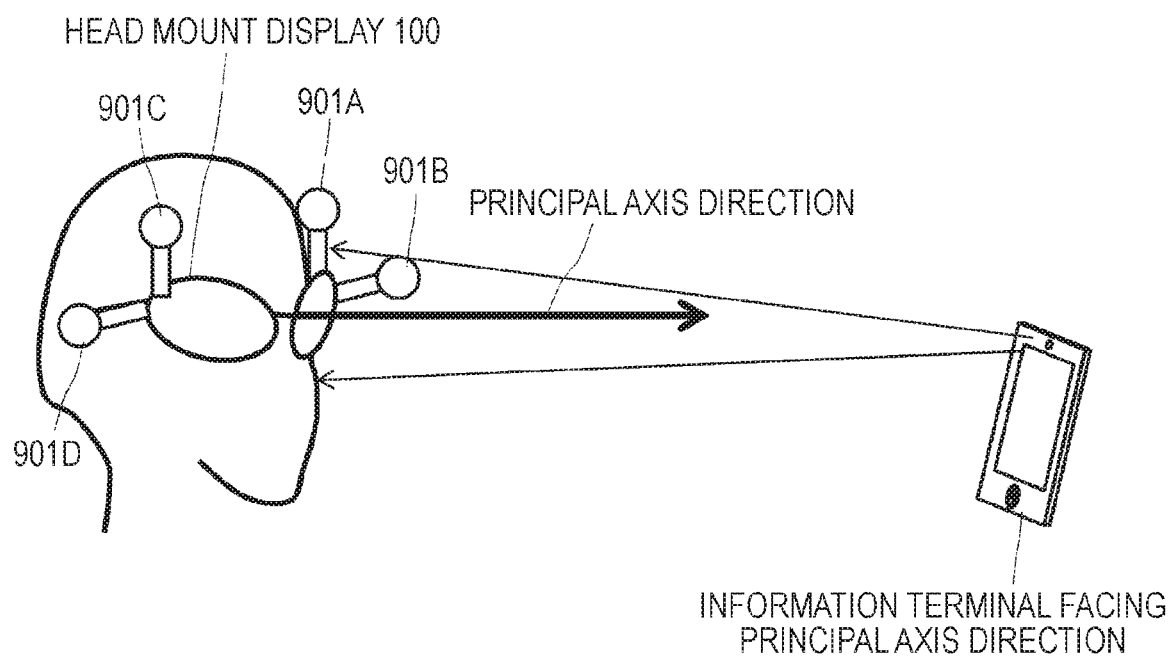
FIG. 9 is a diagram illustrating a state in which reference indexes 901A to D having a known shape are mounted on the head mount display 100, and the camera of the information terminal which is held in the principal axis front direction captures an image of the head mount display 100.

Further, FIG. 9 illustrates a state in which reference indexes 901A to D having a known shape are mounted on the head mount display 100, and the camera of the information terminal which is held in the principal axis front direction captures an image of the head mount display 100. Arrangement information of each of the reference indexes 901A to D is known. In the information terminal, the relative position and posture of the information terminal can be calculated by observing the position of each of the reference indexes 901A to D on the captured image. However, it is necessary to install three or more reference indexes. A method that captures an image of three or more points having known three-dimensional coordinates and obtains the position/posture of the camera from the position of each of the points on the image, that is, a method that calculates mapping from a known three-dimensional coordinate system to two-dimensional coordinates defined on a camera image is an established technology which is called 3D-2D registration in the field of, for example, image processing. Observation of at least three or more points is required to obtain six variables corresponding to position/posture called an external parameter of the camera. Typically, estimation using the least squares method is performed using more observation points (note that, here, an internal parameter of the camera is known).

In both the transmission means illustrated in FIGS. 8 and 9, the relative position and posture of the information terminal can be recognized by the camera on the information terminal, and it is not necessary to use the outer camera 312 on the head mount display 100.

(2) The reference index transmits necessary information to the information terminal.

Figure 10:
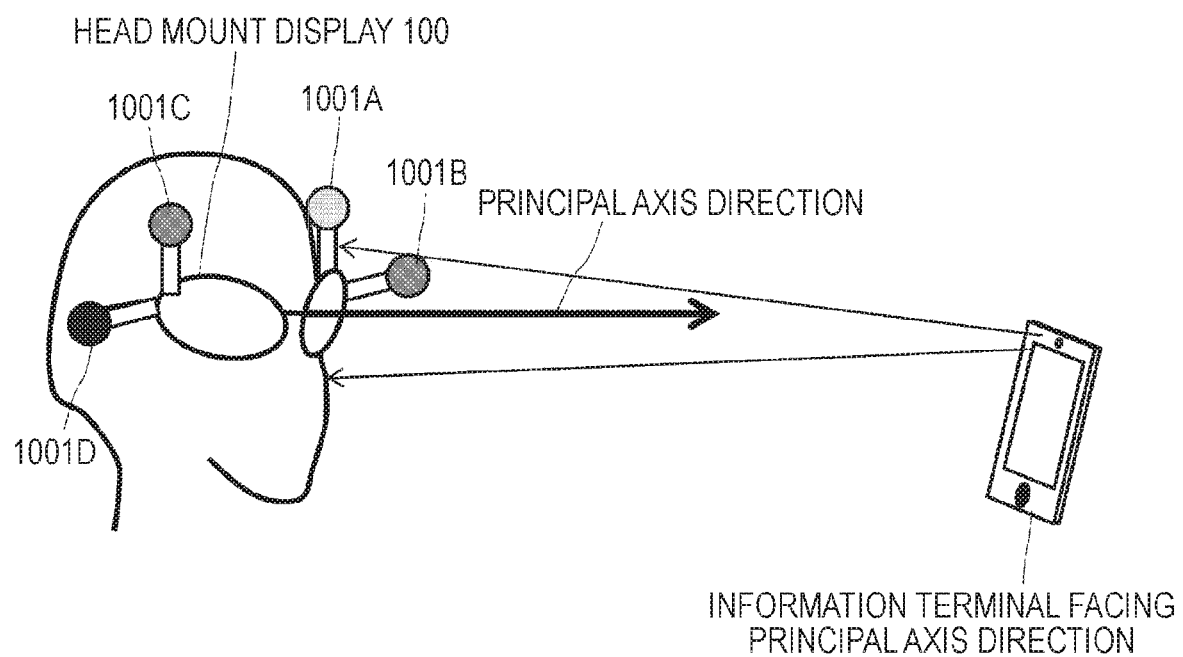
FIG. 10 is a diagram illustrating a state in which four or more reference indexes 1001A to D having different colors and a known shape are mounted on the head mount display 100, and the camera of the information terminal which is held in the principal axis front direction captures an image of the head mount display 100.

FIG. 10 illustrates a state in which three or more reference indexes 1001A to D having different colors and a known shape are mounted on the head mount display 100, and the camera of the information terminal which is held in the principal axis front direction captures an image of the head mount display 100. The reference indexes 1001A to D have different colors, textures and shapes, and axial information of the reference coordinate system of the head mount display 100 is transmitted to the information terminal according to the combination of thereof. Arrangement information is known. In the information terminal, discrimination between the reference indexes 1001A to D can be made on the basis of the color, texture, and shape of each of the reference indexes 1001A to D on the captured image. For example, a line formed by connecting the reference indexes 1001B and 1001D is defined as a reference horizontal line. Further, a combination of the reference indexes 1001A and 100B or a combination of the reference indexes 1001C and 1001D represents a reference vertical line.

Figure 11:
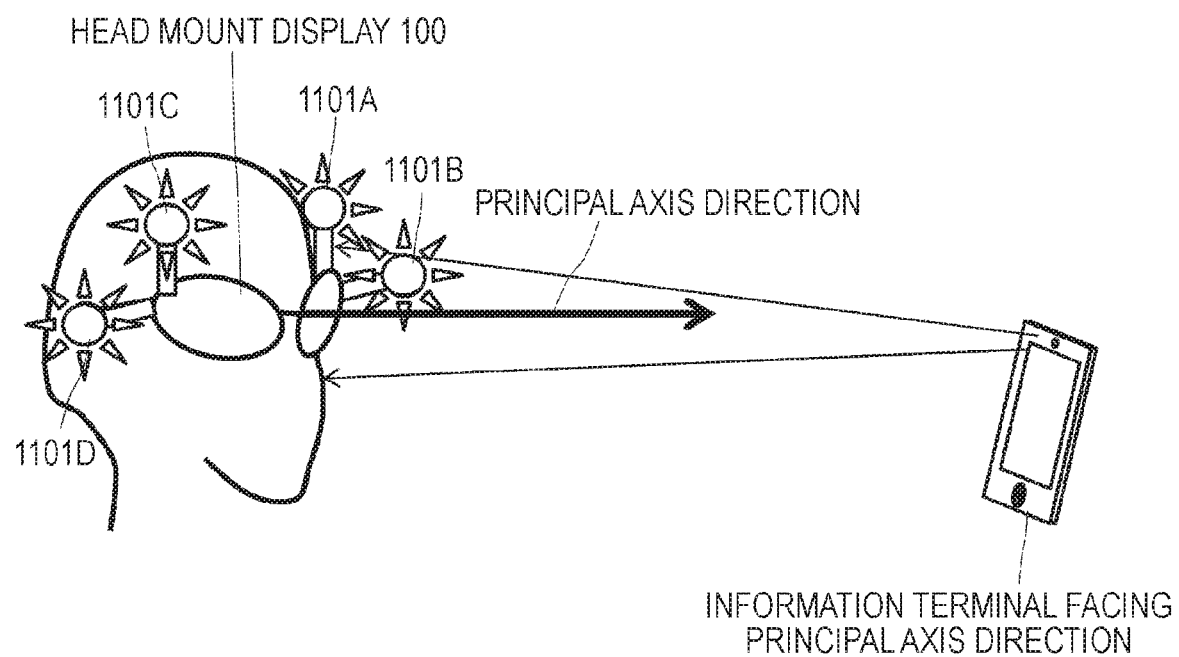
FIG. 11 is a diagram illustrating a state in which reference indexes 1101A to D each of which flashes are mounted on the head mount display 100, and the camera of the information terminal which is held in the principal axis front direction captures an image of the head mount display 100.

Further, FIG. 11 illustrates a state in which reference indexes 1101A to D each of which flashes are mounted on the head mount display 100, and the camera of the information terminal which is held in the principal axis front direction captures an image of the head mount display 100. In each of the reference indexes 1101A to D, information which is desired to be transmitted such as positional information of each of the indexes in the reference coordinate system of the head mount display 100, model number information of the head mount display 100 in which the indexes are installed, or a retrieval key of a database which stores other necessary data is encoded in a flashing pattern, and the information terminal can obtain information by decoding the flashing pattern. In both the transmission means, the relative position and posture of the information terminal can be recognized by the camera on the information terminal, and it is not necessary to use the outer camera 312 on the head mount display 100.

Figure 12:
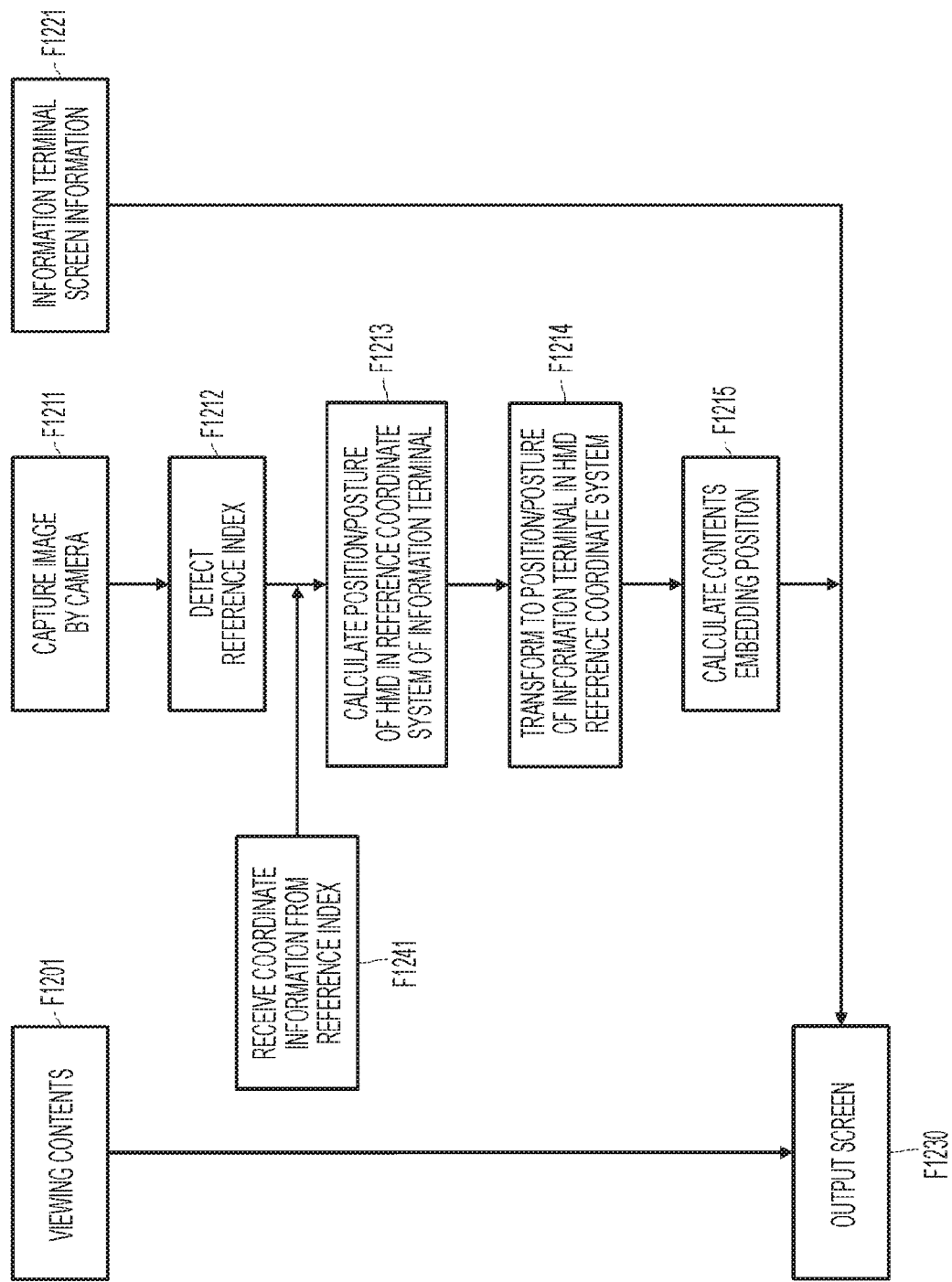
FIG. 12 is a diagram illustrating a procedure for embedding screen information of the information terminal in the screen of the head mount display 100 on the basis of object coordinates received from the reference index.

FIG. 12 illustrates a procedure for embedding screen information of the information terminal in the screen of the head mount display 100 on the basis of object coordinates received from the reference index.

In the head mount display 100, viewing contents are displayed on the display unit 309 (F1201).

On the other hand, in the information terminal, an image is captured using a camera which is provided as standard equipment (F1211). The information terminal is held by a user wearing the head mount display 100 in his or her hand, and the camera faces the front face of the head mount display 100. Then, object recognition processing is performed with respect to the captured image to detect a reference index of the head mount display 100 (F1212).

Then, information of object coordinates is received from the reference index (F1241), and the position and posture of the head mount display 100 in a coordinate system based on the information terminal (or a camera coordinate system) are calculated from the position and posture of the detected reference index (F1213). The calculation processing is the 3D-2D registration (described above) or processing equivalent to the 3D-2D registration. That is, it is possible to calculate the position/posture of the HMD (coordinate system) viewed from the camera coordinate system or the position/posture of the camera (coordinate system) viewed from the HMD coordinate system by associating the two-dimensional position of the reference index on the camera coordinates detected in F1212 with the three-dimensional position of each of the reference indexes in the reference coordinate system of the head mount display 100 received in F1241. Here, the position/posture of the HMD viewed from the camera coordinate system is calculated.

Then, the position and posture of the head mount display 100 in the reference coordinate system of the information terminal are transformed to the position and posture of the information terminal in the reference coordinate system of the head mount display 100 (F1214), and the position of embedding screen information of the information terminal with respect to the screen of the viewing contents is calculated on the basis of information of the calculated position and posture (F1215). Note that the processes (F1212 to F1215) after the processing of the captured image may be executed by either the information terminal or the head mount display 100, or may be executed by an external device such as a cloud computer.

Then, the head mount display 100 acquires screen information from the information terminal (F1221), and embeds the screen information in the contents reproducing screen at the embedding position calculated in F1215 to generate an output screen (F1230).

As a result of such processing, the screen of the information terminal is displayed in the contents reproducing screen (an image in a virtual world) of the head mount display 100 with the same position and posture as the actual information terminal on the view of the user. Thus, the user whose view is completely obstructed can perform a screen check and an input operation in the information terminal without losing reality while continuously viewing contents.

Figure 13:
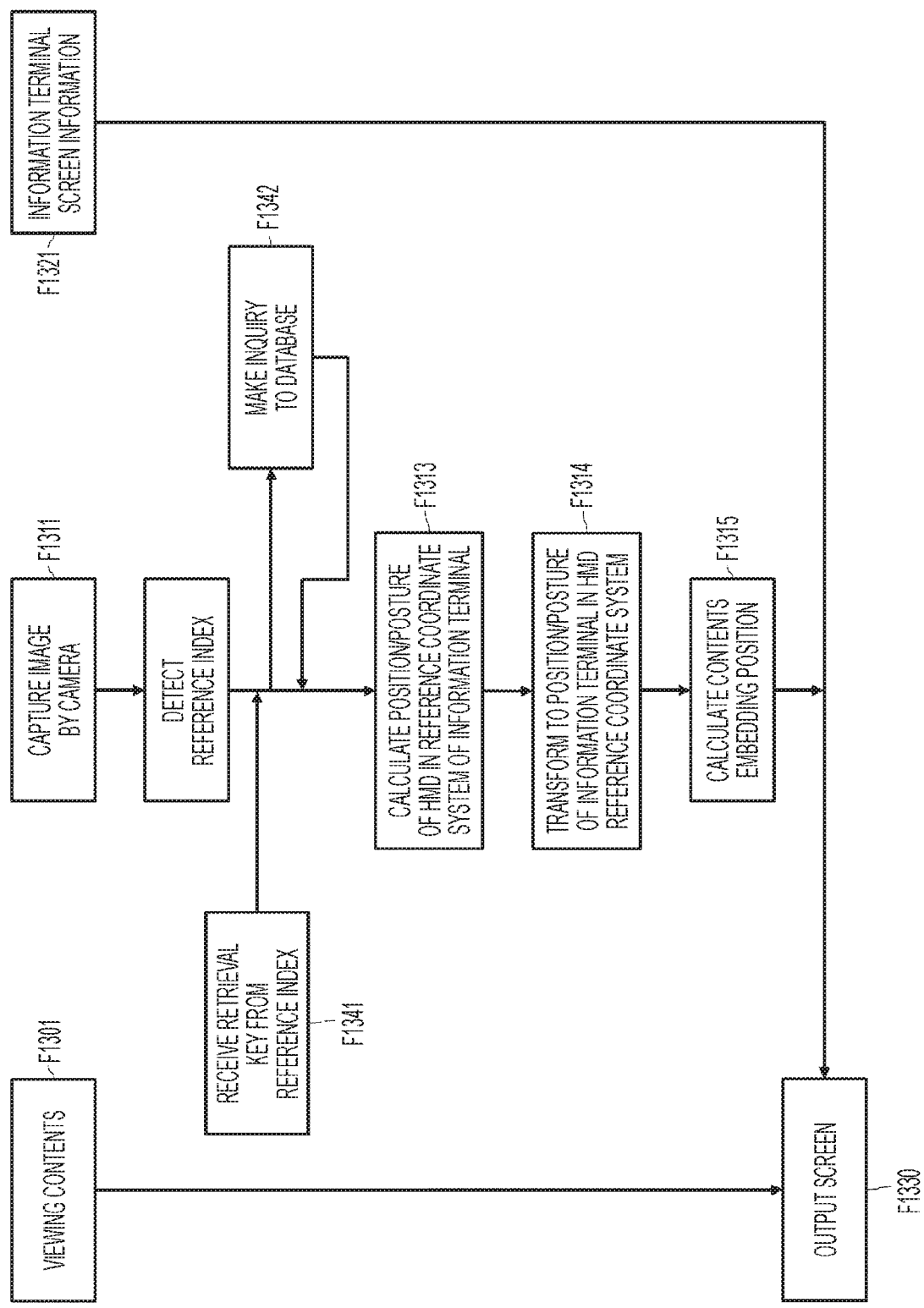
FIG. 13 is a diagram illustrating a procedure for embedding screen information of the information terminal in the screen of the head mount display 100 on the basis of a retrieval key received from the reference index.

FIG. 13 illustrates a procedure for embedding screen information of the information terminal in the screen of the head mount display 100 on the basis of a retrieval key received from the reference index.

In the head mount display 100, viewing contents are displayed on the display unit 309 (F1301).

On the other hand, in the information terminal, an image is captured using a camera which is provided as standard equipment (F1311). The information terminal is held by a user wearing the head mount display 100 in his or her hand, and the camera faces the front face of the head mount display 100. Then, object recognition processing is performed with respect to the captured image to detect a reference index of the head mount display 100 (F1312).

Then, a retrieval key is received from the reference index (F1341), and an inquiry is made using the retrieval key (F1342) to acquire, for example, coordinate information of the reference index, information of the reference index, and information of the head mount display 100. Then, the position and posture of the head mount display 100 in a coordinate system based on the information terminal (or a camera coordinate system) are calculated from the position and posture of the detected reference index (F1313).

Then, the position and posture of the head mount display 100 in the reference coordinate system of the information terminal are transformed to the position and posture of the information terminal in the reference coordinate system of the head mount display 100 (F1314), and the position of embedding screen information of the information terminal with respect to the screen of the viewing contents is calculated on the basis of information of the calculated position and posture (F1315). Note that the processes (F1312 to F1315) after the processing of the captured image may be executed either the information terminal or the head mount display 100, or may be executed by an external device such as a cloud computer.

Then, the head mount display 100 acquires screen information from the information terminal (F1321), and embeds the screen information in the contents reproducing screen at the embedding position calculated in F1315 to generate an output screen (F1330).

As a result of such processing, the screen of the information terminal is displayed in the contents reproducing screen (an image in a virtual world) of the head mount display 100 with the same position and posture as the actual information terminal on the view of the user. Thus, the user whose view is completely obstructed can perform a screen check and an input operation in the information terminal without losing reality while continuously viewing contents.

(3) An initialization process by a user is gone through.

A user wearing the head mount display 100 holds the information terminal with a previously determined initial posture, for example, the front side of the eye-line and performs reset (initialization). In the information terminal, the head mount display 100 whose image has been captured by the camera is recognized by applying, for example, the visual SLAM technology, and the position of the information terminal is initialized corresponding to the posture thereof.

Figure 14:
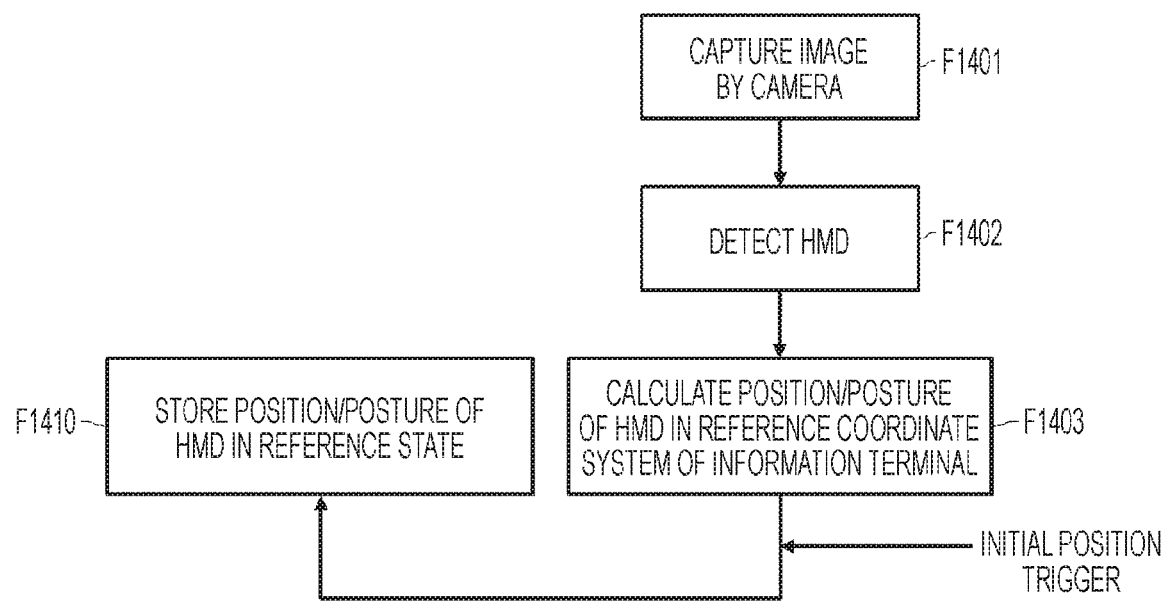
FIG. 14 is a diagram illustrating a procedure for initializing the position of the information terminal.

FIG. 14 illustrates a procedure for initializing the position of the information terminal.

A user wearing the head mount display 100 holds the information terminal with the initial posture, for example, the front side of the eye-line. In this state, an image of the head mount display 100 is captured by the camera of the information terminal (F1401), and the head mount display 100 is detected from the captured image (F1402). Then, the position and posture of the head mount display 100 in a coordinate system based on the information terminal (or a camera coordinate system) are calculated (F1403).

Here, for example, when the user performs an initial position trigger, the calculated position and posture of the head mount display 100 are stored as the position and posture of the head mount display 100 in a reference state (F1410).

Figure 15:
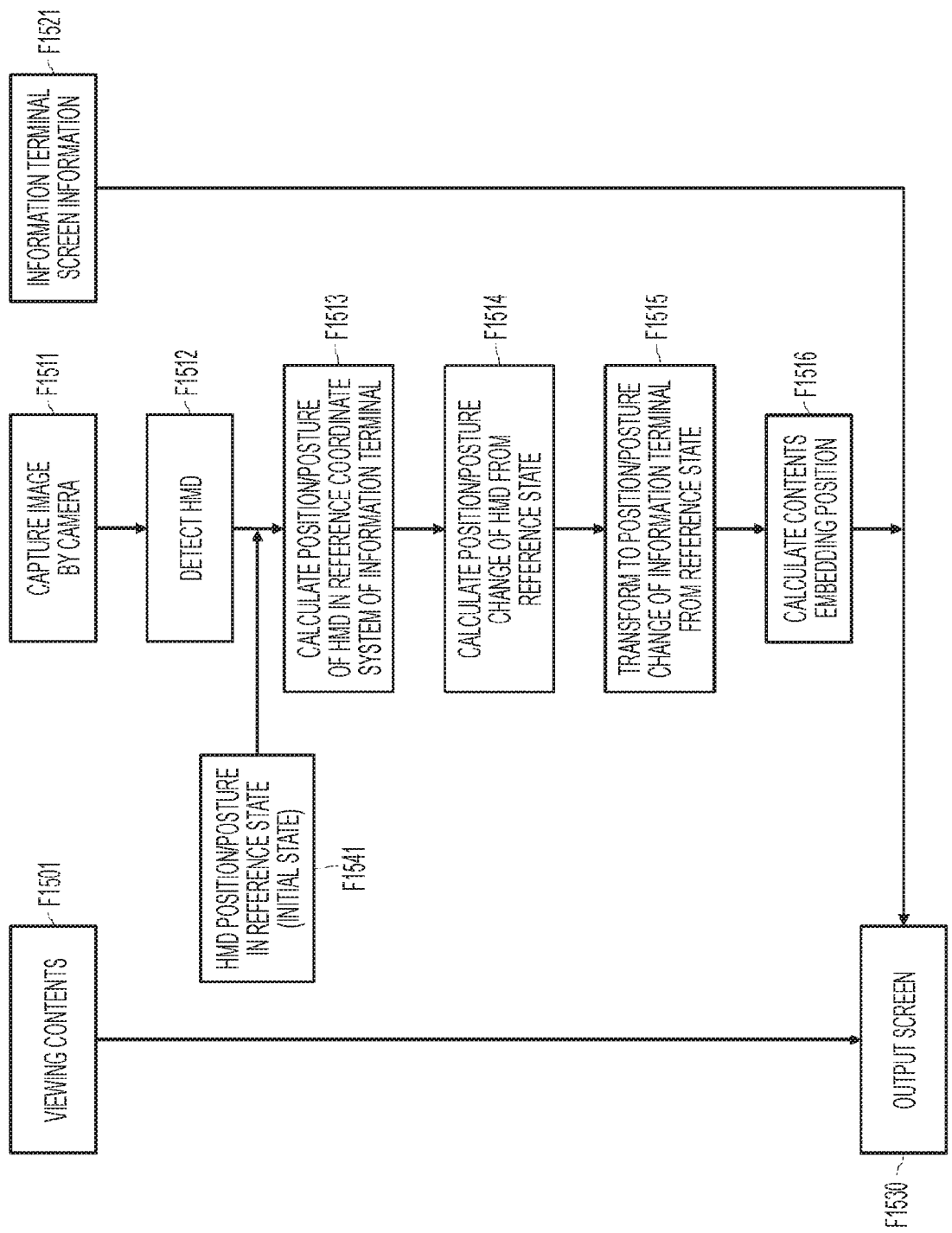
FIG. 15 is a diagram illustrating a procedure for embedding screen information of the information terminal in the screen of the head mount display 100 using the position of the information terminal initialized by the procedure illustrated in FIG. 14.

FIG. 15 illustrates a procedure for embedding screen information of the information terminal in the screen of the head mount display 100 using the position of the information terminal initialized by the procedure illustrated in FIG. 14.

In the head mount display 100, viewing contents are displayed on the display unit 309 (F1501).

On the other hand, in the information terminal, an image is captured using a camera which is provided as standard equipment (F1511). The information terminal is held by a user wearing the head mount display 100 in his or her hand, and the camera faces the front face of the head mount display 100. Then, object recognition processing is performed with respect to the captured image to detect the head mount display 100 (F1512). Then, the position and posture of the head mount display 100 in a coordinate system based on the information terminal (or a camera coordinate system) are calculated (F1513).

Then, the position and posture of the head mount display 100 in a reference state (refer to FIG. 14) are read (F1541), and a change in the posture of the head mount display 100 from the reference state is calculated (F1514). How the position/posture of the information terminal has changed from the reference state can be calculated by performing reverse calculation of a change in the position and posture of the information terminal (camera) that produce the above change in the position/posture of the head mount display 100 assuming that the head mount display 100 remains stationary (F1515). Then, the position of embedding screen information of the information terminal with respect to the screen of the viewing contents is calculated on the basis of information of the calculated change in the position and posture of the information terminal (F1516). Note that the processes (F1512 to F1516) after the processing of the captured image may be executed either the information terminal or the head mount display 100, or may be executed by an external device such as a cloud computer.

Then, the head mount display 100 acquires screen information from the information terminal (F1521), and embeds the screen information in the contents reproducing screen at the embedding position calculated in F1516 to generate an output screen (F1530).

As a result of such processing, the screen of the information terminal is displayed in the contents reproducing screen (an image in a virtual world) of the head mount display 100 with the same position and posture as the actual information terminal on the view of the user. Thus, the user whose view is completely obstructed can perform a screen check and an input operation in the information terminal without losing reality while continuously viewing contents.

INDUSTRIAL APPLICABILITY

In the above, the technology disclosed in the present specification has been specifically described with reference to the specific embodiment. However, it is obvious that a person skilled in the art may perform amendments and substitutions for the embodiment without departing from the gist of the technology disclosed in the present specification.

The technology disclosed in the present specification can be suitably applied to an immersive head mount display equipped with no camera. It is needless to say that the technology can also be applied to a video see-through head mount display equipped with a camera, a transmissive, that is, optical see-through head mount display, and, in addition, various types of image display apparatuses other than a head mount display in a similar manner.

Further, the technology disclosed in the present specification can be suitably applied to both binocular and monocular head mount displays.

In short, although the technology disclosed in the present specification has been described in the form of exemplification, description contents of the present specification should not be interpreted in a limited manner. In order to judge the gist of the technology disclosed in the present specification, the claims should be considered.

Note that the technology disclosed in the present specification can employ the following configurations.

(1) An information processing apparatus including:
an image capturing unit;
a position/posture calculation unit that calculates, on the basis of an image of an external image display apparatus captured by the image capturing unit, position and posture of the image display apparatus in a first reference coordinate system of the information processing apparatus;
a position/posture transform unit that transforms the position and posture of the image display apparatus in the first reference coordinate system to position and posture of the information processing apparatus in a second reference coordinate system of the image display apparatus; and an embedding position calculation unit that calculates, on the basis of the position and posture of the information processing apparatus in the second reference coordinate system, a position of embedding screen information relating to the information processing apparatus in a screen of the image display apparatus.

(2) An information processing apparatus including:
an image capturing unit;
a display unit;
a position/posture calculation unit that calculates, on the basis of an image of an external image display apparatus captured by the image capturing unit, position and posture of the image display apparatus in a first reference coordinate system of the information processing apparatus;
a position/posture transform unit that transforms the position and posture of the image display apparatus in the first reference coordinate system to position and posture of the information processing apparatus in a second reference coordinate system of the image display apparatus; and
an embedding position calculation unit that calculates, on the basis of the position and posture of the information processing apparatus in the second reference coordinate system, a position of embedding screen information of the display unit with respect to a screen of the image display apparatus.

(3) The information processing apparatus according to (2), further including a communication unit that communicates with the image display apparatus,
wherein screen information of the display unit and information of the embedding position are transmitted to the image display apparatus through the communication unit.

(4) The information processing apparatus according to (2) or (3), wherein the position/posture calculation unit calculates the position and posture of the image display apparatus in the first reference coordinate system on the basis of a reference index mounted on the image display apparatus.

(5) The information processing apparatus according to (4), further including a reference index arrangement information acquisition unit that acquires information relating to a relationship between posture of the image display apparatus and posture of the reference index.

(6) The information processing apparatus according to (5),
wherein the reference index arrangement information acquisition unit preloads design information relating to the relationship between the posture of the image display apparatus and the posture of the reference index, and
the position/posture calculation unit calculates the position and posture of the image display apparatus in the first reference coordinate system on the basis of the design information from an image captured by the image capturing unit when the information processing apparatus is arranged in a predetermined direction with respect to the image display apparatus.

(7) The information processing apparatus according to (5), wherein the reference index arrangement information acquisition unit receives information from the reference index.

(8) The information processing apparatus according to (7),
wherein three or more reference indexes whose arrangement information is known are arranged on the image display apparatus, and
the reference index arrangement information acquisition unit makes discrimination between the reference indexes on the basis of at least one of color, texture, and shape and acquires axial information of the reference coordinate system of the image display apparatus.

(9) The information processing apparatus according to (7), wherein the reference index arrangement information acquisition unit receives information encoded in a flashing pattern from the reference index.

(10) The information processing apparatus according to (9), wherein the reference index arrangement information acquisition unit makes an inquiry about information obtained by decoding the flashing pattern to a database to acquire coordinate information of the reference index, information of the reference index, or information of the image display apparatus.

(11) The information processing apparatus according to (2) or (3), wherein the position/posture calculation unit calculates the position and posture of the image display apparatus in the first reference coordinate system using visual simultaneous localization and mapping (SLAM).

(12) The information processing apparatus according to (11),
wherein position and posture of the image display apparatus calculated by the position/posture calculation unit in a reference state in which the information processing apparatus is held in an initial posture are stored, and
the position/posture transform unit calculates a change in the posture of the image display apparatus from the reference state and transforms the position and posture of the image display apparatus in the first reference coordinate system to the position and posture of the information processing apparatus in the second reference coordinate system.

(13) An image processing method including:
a position/posture calculation step of calculating, on the basis of an image of another image display apparatus captured by an image capturing unit mounted on an information terminal, position and posture of the image display apparatus in a first reference coordinate system of the information terminal;
a position/posture transform step of transforming the position and posture of the image display apparatus in the first reference coordinate system to position and posture of the information terminal in a second reference coordinate system of the image display apparatus; and
an embedding position calculation step of calculating, on the basis of the position and posture of the information terminal in the second reference coordinate system, a position of embedding screen information of the information terminal with respect to a screen of the image display apparatus.

(14) An image display system including:
a display apparatus fixed to a head or face of an observer; and
an information processing apparatus that includes an image capturing unit and a display unit, calculates, on the basis of an image of an external image display apparatus captured by the image capturing unit, position and posture of the image display apparatus in a first reference coordinate system of the information processing apparatus, transforms the position and posture of the image display apparatus in the first reference coordinate system to position and posture of the information processing apparatus in a second reference coordinate system of the image display apparatus, and calculates a position of embedding screen information of the display unit with respect to a screen of the image display apparatus.

REFERENCE SIGNS LIST

100 Head mount display
101L, 101R Virtual image optical unit 103L, 103R Microphone
104L, 104R Display panel
105 Pupil distance adjustment mechanism
301 Control unit
301A ROM
301B RAM
302 Input operation unit
303 Remote-control reception unit
304 State information acquisition unit
305 Communication unit
306 Storage unit
307 Image processing unit
308 Display drive unit
309 Display unit
310 Virtual image optical unit
312 Outer camera
313 Audio processing unit
314 Audio input/output unit
315 Touch panel
316 Environment information acquisition unit
1610 Control unit
1611 CPU
1612 ROM
1613 RAM
1620 Display unit
1621 Display panel
1622 Display interface
1623 Touch panel
1624 Touch interface
1630 Audio processing unit
1631 Audio output unit
1632 Audio input unit
1634 Output terminal
1640 Communication unit
1650 Storage unit
1660 Camera unit
1661 Image sensor
1662 AFE processing unit
1663 Camera interface
1670 Sensor unit

The invention claimed is:

1. An information processing apparatus, comprising:
an image sensor configured to capture an image of an external image display apparatus, wherein the external image display apparatus is wearable on one of an observer head or an observer face; and
circuitry configured to:
determine a specific arrangement of at least three reference indexes on the external image display apparatus based on the captured image;
determine a position of the external image display apparatus and a posture of the external image display apparatus in a first reference coordinate system of the information processing apparatus, based on the determined specific arrangement of the at least three reference indexes;
acquire axial information of a second reference coordinate system of the external image display apparatus based on the determined specific arrangement of the at least three reference indexes;
transform the position of the external image display apparatus and the posture of the external image display apparatus in the first reference coordinate system to a position of the information processing apparatus and a posture of the information processing apparatus, respectively, in the second reference coordinate system of the external image display apparatus, based on the acquired axial information; and
determine an embedding position of screen information of the information processing apparatus with respect to a display screen of the external image display apparatus, based on the position of the information processing apparatus and the posture of the information processing apparatus in the second reference coordinate system,
wherein the screen information is displayable on the display screen of the external image display apparatus at the determined embedding position.

2. An information processing apparatus, comprising:
an image sensor configured to capture an image of an external image display apparatus, wherein the external image display apparatus is wearable on one of an observer head or an observer face;
a first display screen; and
circuitry configured to:
determine a specific arrangement of at least three reference indexes on the external image display apparatus from the captured image;
determine a position of the external image display apparatus and a posture of the external image display apparatus in a first reference coordinate system of the information processing apparatus, based on the determined specific arrangement of the at least three reference indexes;
acquire axial information of a second reference coordinate system of the external image display apparatus based on the determined specific arrangement of the at least three reference indexes;
transform the position of the external image display apparatus and the posture of the external image display apparatus in the first reference coordinate system to a position of the information processing apparatus and a posture of the information processing apparatus, respectively, in the second reference coordinate system of the external image display apparatus, based on the acquired axial information; and
determine an embedding position of screen information of the first display screen with respect to a second display screen of the external image display apparatus, based on the position of the information processing apparatus and the posture of the information processing apparatus in the second reference coordinate system,
wherein the screen information is displayable on the second display screen of the external image display apparatus at the determined embedding position.

3. The information processing apparatus according to claim 2, wherein the circuitry is further configured to:
establish a communication with the external image display apparatus; and
transmit the screen information of the first display screen and first information of the determined embedding position to the external image display apparatus, through the communication.

4. The information processing apparatus according to claim 2, wherein the circuitry is further configured to determine the position of the external image display apparatus and the posture of the external image display apparatus in the first reference coordinate system based on the at least three reference indexes mounted on the external image display apparatus.

5. The information processing apparatus according to claim 4, wherein the circuitry is further configured to acquire second information relating to a relationship between the posture of the external image display apparatus and a posture of the at least three reference indexes.

6. The information processing apparatus according to claim 5,
wherein the image sensor is further configured to capture an image of the at least three reference indexes based on the information processing apparatus that is arranged in a specific direction with respect to the external image display apparatus, and
wherein the circuitry is further configured to:
preload design information relating to the relationship between the posture of the external image display apparatus and the posture of the at least three reference indexes; and
determine the position of the external image display apparatus and the posture of the external image display apparatus in the first reference coordinate system based on the design information and the captured image of the at least three reference indexes.

7. The information processing apparatus according to claim 5, wherein the circuitry is further configured to receive third information from the at least three reference indexes.

8. The information processing apparatus according to claim 7, wherein
the specific arrangement of the at least three reference indexes is determined based on at least one of a color of each of the at least three reference indexes, a texture of each of the at least three reference indexes, or a shape of each of the at least three reference indexes.

9. The information processing apparatus according to claim 7, wherein the circuitry is further configured to receive fourth information encoded in a flashing pattern from the at least three reference indexes.

10. The information processing apparatus according to claim 9, wherein the circuitry is further configured to:
decode the flashing pattern to obtain the fourth information; and
execute an inquiry operation to acquire, from a database, at least one of coordinate information of the at least three reference indexes, fifth information of the at least three reference indexes, or sixth information of the external image display apparatus.

11. The information processing apparatus according to claim 2, wherein the circuitry is further configured to determine the position of the external image display apparatus and the posture of the external image display apparatus in the first reference coordinate system, based on visual simultaneous localization and mapping (SLAM).

12. The information processing apparatus according to claim 11, wherein the circuitry is further configured to:
determine the position of the external image display apparatus and the posture of the external image display apparatus in a reference state in which the information processing apparatus is held in an initial posture;
determine a change in the posture of the external image display apparatus from the reference state; and
transform the position of the external image display apparatus and the posture of the external image display apparatus in the first reference coordinate system to the position of the information processing apparatus and the posture of the information processing apparatus, respectively, in the second reference coordinate system, based on the determined change.

13. An image processing method, comprising:
in an information terminal:
capturing an image of an external image display apparatus, wherein the external image display apparatus is wearable on one of an observer head or an observer face;
determining a specific arrangement of at least three reference indexes on the external image display apparatus based on the captured image;
determining a position of the external image display apparatus and a posture of the external image display apparatus in a first reference coordinate system of the information terminal, based on the determined specific arrangement of the at least three reference indexes;
acquiring axial information of a second reference coordinate system of the external image display apparatus based on the determined specific arrangement of the at least three reference indexes;
transforming the position of the external image display apparatus and the posture of the external image display apparatus in the first reference coordinate system to a position of the information terminal and a posture of the information terminal, respectively, in the second reference coordinate system of the external image display apparatus, based on the acquired axial information; and
determining an embedding position of screen information of the information terminal with respect to a display screen of the external image display apparatus, based on the position of the information terminal and the posture of the information terminal in the second reference coordinate system,
wherein the external image display apparatus displays the screen information on the display screen of the external image display apparatus at the determined embedding position.

14. An image display system, comprising:
an external image display apparatus wearable on one of an observer head or an observer face; and
an information processing apparatus that includes:
an image sensor configured to capture an image of the external image display apparatus;
a first display screen; and
circuitry configured to:
determine a specific arrangement of at least three reference indexes on the external image display apparatus from the captured image;
determine a position of the external image display apparatus and a posture of the external image display apparatus in a first reference coordinate system of the information processing apparatus, based on the determined specific arrangement of the at least three reference indexes;
acquire axial information of a second reference coordinate system of the external image display apparatus based on the determined specific arrangement of the at least three reference indexes;
transform the position of the external image display apparatus and the posture of the external image display apparatus in the first reference coordinate system to a position of the information processing apparatus and a posture of the information processing apparatus, respectively, in the second reference coordinate system of the external image display apparatus, based on the acquired axial information; and determine an embedding position of screen information of the first display screen with respect to a second display screen of the external image display apparatus, based on the position of the information processing apparatus and the posture of the information processing apparatus in the second reference coordinate system, wherein the external image display apparatus is configured to display the screen information on the second display screen of the external image display apparatus at the determined embedding position.

15. An information processing apparatus, comprising:
an image sensor configured to capture an image of an external image display apparatus, wherein
at least three reference indexes are on the external image display apparatus, and
the at least three reference indexes are configured to have a specific arrangement;
a first display screen; and
circuitry configured to:
determine the specific arrangement of the at least three reference indexes from the image based on at least one of a color of each of the at least three reference indexes, a texture of each of the at least three reference indexes, or a shape of each of the at least three reference indexes;

determine a position of the external image display apparatus and a posture of the external image display apparatus in a first reference coordinate system of the information processing apparatus, based on the determined specific arrangement of the at least three reference indexes;

acquire axial information of a second reference coordinate system of the external image display apparatus based on the determined specific arrangement of the at least three reference indexes;

transform the position of the external image display apparatus and the posture of the external image display apparatus in the first reference coordinate system to a position of the information processing apparatus and a posture of the information processing apparatus, respectively, in the second reference coordinate system of the external image display apparatus, based on the acquired axial information; and determine an embedding position of screen information of the first display screen with respect to a second display screen of the external image display apparatus, based on the position of the information processing apparatus and the posture of the information processing apparatus in the second reference coordinate system.

* * * * *